(12) United States Patent
Ehsen et al.

(10) Patent No.: US 11,408,084 B2
(45) Date of Patent: Aug. 9, 2022

(54) THIN FILM ELECTRODE CONTAINING NANOSTRUCTURED COBALT OXIDE FOR WATER SPLITTING

(71) Applicant: KING FAHD UNIVERSITY OF PETROLEUM AND MINERALS, Dhahran (SA)

(72) Inventors: Muhammad Ali Ehsen, Dhahran (SA); Abbas Saeed Hakeem, Gujrat (PK); Abdul Rehman, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 28 days.

(21) Appl. No.: 16/738,597

(22) Filed: Jan. 9, 2020

(65) Prior Publication Data
US 2021/0214850 A1 Jul. 15, 2021

(51) Int. Cl.
*C25B 11/077* (2021.01)
*C25B 11/02* (2021.01)
*C25B 1/04* (2021.01)
*C25B 9/17* (2021.01)
*B82Y 30/00* (2011.01)
*B82Y 40/00* (2011.01)

(52) U.S. Cl.
CPC ............ *C25B 11/077* (2021.01); *C25B 1/04* (2013.01); *C25B 9/17* (2021.01); *C25B 11/02* (2013.01); *B82Y 30/00* (2013.01); *B82Y 40/00* (2013.01)

(58) Field of Classification Search
CPC ............ C25B 1/02; C25B 1/044; C25B 11/051–11/097; B01J 23/75; B01J 2523/845–2531/845
See application file for complete search history.

(56) References Cited

U.S. PATENT DOCUMENTS

| 8,968,820 B2 | 3/2015 | Zhamu et al. |
| 2014/0315105 A1* | 10/2014 | Lee ............ H01M 4/8807 429/405 |

FOREIGN PATENT DOCUMENTS

| CN | 108529557 A | 9/2018 |
| JP | 2019-50186 A | 3/2019 |
| WO | WO 2017/182923 A1 | 10/2017 |

OTHER PUBLICATIONS

Ranaweera et al ("Flower-shaped cobalt oxide nano-structures as an efficient, flexible and stable electrocatalyst for the oxygen evolution reaction", Materials Chemistry Frontiers, 2017, 1, pp. 1580-1584) (Year: 2017).*

(Continued)

*Primary Examiner* — Alexander W Keeling
(74) *Attorney, Agent, or Firm* — Oblon, McClelland, Maier & Neustadt, L.L.P.

(57) ABSTRACT

A thin film electrode involving a nanostructured catalytic material deposited onto a surface of a conducting substrate and method of making is described. The nanostructured catalytic material contains cobalt oxide nanoflowers having a central core and nanopetals extending from the central core. The method of making the thin film electrode involves contacting the conducting substrate with an aerosol containing a cobalt complex and a solvent. A method of using the thin film electrode in an electrochemical cell for water splitting is also provided.

19 Claims, 12 Drawing Sheets

(56) References Cited

OTHER PUBLICATIONS

Du et al ("Oxygen vacancies enriched Co3O4 nanoflowers with single layer porous structures for water splitting", Electrochimica Acta, vol. 331, Dec. 2019, pp. 1-8) (Year: 2019).*

Wu et al (Octahedral Co3O4 particles with high electrochemical surface area as electrocatalyst for water splitting, Electrochimica Acta, vol. 288, 2018, pp. 82-90) (Year: 2018).*

Kent et al ("Water Oxidation and Oxygen Monitoring by Cobalt-Modified Fluorine-Doped Tin Oxide Electrodes", Journal of the American Chemical Society, 2013, 135, 23, pp. 8432-8435) (Year: 2013).*

Liu et al ("Robust Sub-Monolayers of Co3O4 Nano-Islands: A Highly Transparent Morphology for Efficient Water Oxidation Catalysis", Advanced Energy Materials, 2016, 6, pp. 1600697-1-1600697-9) (Year: 2016).*

Zhang et al ("Controlling the Synthesis of CoO Nanocrystals with Various Morphologies", The Journal of Physical Chemistry C, 2008, 112, 114, pp. 5322-5327) (Year: 2008).*

Muhammad Ali Ehsan, et al., "Direct Deposition of Amorphous Cobalt-Vanadium Mixed Oxide Films for Electrocatalytic Water Oxidation", ACS Omega, vol. 4, No. 7, Jul. 25, 2019, pp. 12671-12679.

E. Fischer Rivera, et al., "CVD deposition of cobalt oxide ($Co_3O_4$) from $Co(acac)_2$", Journal De Physique IV France, vol. 11, 2001, pp. Pr3-629-Pr3-635.

Taewon LEE, et al., "Fabrication of $LiCoO_2$ cathode powder for thin film battery by aerosol flame deposition", Journal of Power Sources, vol. 174, Issue 2, Dec. 6, 2007, pp. 394-399.

Humaira Rashid Khan. et al., "Chemically vaporized cobalt incorporated wurtzite as photoanodes for efficient photoelectrochemical water splitting", Materials Science in Semiconductor Processing, vol. 101, Oct. 2019, pp. 223-229 (Abstract only).

* cited by examiner

THIN FILM ELECTRODE CONTAINING NANOSTRUCTURED COBALT OXIDE FOR WATER SPLITTING

STATEMENT OF ACKNOWLEDGEMENT

This project was completed with support from the Center of Excellence in Nanotechnology (CENT) at King Fahd University of Petroleum & Minerals (KFUPM).

BACKGROUND OF THE INVENTION

Technical Field

The present disclosure relates to a thin film electrode having nanostructured cobalt oxide and methods of its preparation. The present disclosure further relates to a method of using the thin film electrode as part of an electrochemical cell for water splitting.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electrochemical water splitting is a reliable source of hydrogen [Tachibana, Y.; Vayssieres, L.; Durrant, J. R., Artificial photosynthesis for solar water-splitting. *Nature Photonics* 2012, 6, 511], which is a cleaner, greener and more sustainable energy reserve than fossil fuels [Luo, J.; Im, J.-H.; Mayer, M. T.; Schreier, M.; Nazeeruddin, M. K.; Park, N.-G.; Tilley, S. D.; Fan, H. J.; Grätzel, M., Water photolysis at 12.3% efficiency via perovskite photovoltaics and Earth-abundant catalysts. *Science* 2014, 345 (6204), 1593]. A bottle neck in the water splitting process is the oxygen evolution reaction (OER) that occurs during the oxidation of water. The oxygen evolution reaction involves multiple proton-coupled electron transfers that proceed only after overcoming the high energy barrier of bond formation between two oxygen atoms [Huo, M.; Yang, Z.; Yang, C.; Gao, Z.; Qi, J.; Liang, Z.; Liu, K.; Chen, H.; Zheng, H.; Cao, R., Hierarchical Zn-Doped CoO Nanoflowers for Electrocatalytic Oxygen Evolution Reaction. *ChemCatChem* 2019, 11 (5), 1480-1486; Liang, Z.; Huang, Z.; Yuan, H.; Yang, Z.; Zhang, C.; Xu, Y.; Zhang, W.; Zheng, H.; Cao, R., Quasi-single-crystalline CoO hexagrams with abundant defects for highly efficient electrocatalytic water oxidation. *Chemical Science* 2018, 9 (34), 6961-6968; Ling, T.; Yan, D.-Y.; Jiao, Y.; Wang, H.; Zheng, Y.; Zheng, X.; Mao, J.; Du, X.-W.; Hu, Z.; Jaroniec, M.; Qiao, S.-Z., Engineering surface atomic structure of single-crystal cobalt (II) oxide nanorods for superior electrocatalysis. *Nature Communications* 2016, 7, 12876; and Zheng, Y.; Jiao, Y.; Qiao, S. Z., Engineering of Carbon-Based Electrocatalysts for Emerging Energy Conversion: From Fundamentality to Functionality, *Adv Mater* 2015, 27 (36), 5372-8]. Thus, efficient and robust catalytic materials are required to catalyze water oxidation. At the same time, these materials need to be low cost and easy to produce in order to replace current noble metal based benchmarks for water oxidation, which are scarce and costly [Zhang, W.; Lai, W.; Cao, R., Energy-Related Small Molecule Activation Reactions: Oxygen Reduction and Hydrogen and Oxygen Evolution Reactions Catalyzed by Porphyrin- and Corrole-Based Systems. *Chemical Reviews* 2017, 117 (4), 3717-3797].

Various catalysts including oxides [Song, F.; Bai, L.; Moysiadou, A.; Lee, S.; Hu, C.; Liardet, L.; Hu, X., Transition Metal Oxides as Electrocatalysts for the Oxygen Evolution Reaction in Alkaline Solutions: An Application-Inspired Renaissance. *Journal of the American Chemical Society* 2018, 140 (25), 7748-7759; and Ehsan, M. A.; Aziz, M. A.; Rehman, A.; Hakeem, A. S.; Qasem, M. A. A.; Saadi, O. W., Facile Synthesis of Gold-Supported Thin Film of Cobalt Oxide via AACVD for Enhanced Electrocatalytic Activity in Oxygen Evolution Reaction. *ECS Journal of Solid State Science and Technology* 2018, 7 (12), P711-P718, each incorporated herein by reference in their entirety], mixed oxides [Ehsan, M.; Naeem, R.; McKee, V.; Rehman, A.; Hakeem, A.; Mazhar, M., Fabrication of photoactive $CaTiO_3$—$TiO_2$ composite thin film electrodes via facile single step aerosol assisted chemical vapor deposition route. 2018; and Ehsan, M.; Naeem, R.; Rehman, A.; Hakeem, A.; Mazhar, M., Facile fabrication of $CeO_2$—$TiO_2$ thin films via solution based CVD and their photoelectrochemical studies. 2018; Vol. 29, each incorporated herein by reference in their entirety], hydroxides [Gao, Y. Q.; Liu, X. Y.; Yang, G. W., Amorphous mixed-metal hydroxide nanostructures for advanced water oxidation catalysts. *Nanoscale* 2016, 8 (9), 5015-5023, incorporated herein by reference in its entirety], double hydroxides [Cai, Z.; Bu, X.; Wang, P.; Ho, J. C.; Yang, J.; Wang, X., Recent advances in layered double hydroxide electrocatalysts for the oxygen evolution reaction. *Journal of Materials Chemistry A* 2019, 7 (10), 5069-5089, incorporated herein by reference in its entirety], phosphides [Wang, P.; Song, F.; Amal, R.; Ng, Y. H.; Hu, X., Efficient Water Splitting Catalyzed by Cobalt Phosphide-Based Nanoneedle Arrays Supported on Carbon Cloth. *ChemSusChem* 2016, 9 (5), 472-477, incorporated herein by reference in its entirety], nitrides [Zhang, Y.; Ouyang, B.; Xu, J.; Jia, G.; Chen, S.; Rawat, R. S.; Fan, H. J., Rapid Synthesis of Cobalt Nitride Nanowires: Highly Efficient and Low-Cost Catalysts for Oxygen Evolution. *Angewandte Chemie International Edition* 2016, 55 (30), 8670-8674, incorporated herein by reference in its entirety], sulfides [Ehsan, M. A.; Peiris, T. A. N.; Wijayantha, K. G. U.; Khaledi, H.; Ming, H. N.; Misran, M.; Arifin, Z.; Mazhar, M., Surface morphological and photoelectrochemical studies of ZnS thin films developed from single source precursors by aerosol assisted chemical vapour deposition. *Thin Solid Films* 2013, 540, 1-9, incorporated herein by reference in its entirety], and chalcogenides [Long, C.; Liang, Y.; Jin, H.; Huang, B.; Dai, Y., PdSe2: Flexible Two-Dimensional Transition Metal Dichalcogenides Monolayer for Water Splitting Photocatalyst with Extremely Low Recombination Rate. *ACS Applied Energy Materials* 2019, 2 (1), 513-520, incorporated herein by reference in its entirety] of different low cost transition metals for water oxidation have been reported. Cobalt (Co) compounds such as cobalt(II) oxide (CoO) [Liang, Z.; Huang, Z.; Yuan, H.; Yang, Z.; Zhang, C.; Xu, Y.; Zhang, W.; Zheng, H.; Cao, R., Quasi-single-crystalline CoO hexagrams with abundant defects for highly efficient electrocatalytic water oxidation. *Chemical Science* 2018, 9 (34), 6961-6968; Ehsan, M. A.; Aziz, M. A.; Rehman, A.; Hakeem, A. S.; Qasem, M. A. A.; Saadi, O. W., Facile Synthesis of Gold-Supported Thin Film of Cobalt Oxide via AACVD for Enhanced Electrocatalytic Activity in Oxygen Evolution Reaction. *ECS Journal of Solid State Science and Technology* 2018, 7 (12), P711-P718; Jiang, A.; Nidamanuri, N.; Zhang, C.; Li, Z., Ionic-Liquid-Assisted One-Step Synthesis of CoO Nanosheets as Electrocatalysts for Oxygen Evolution Reaction. *ACS Omega* 2018, 3 (8), 10092-10098; Wang, F.; Yu, Y.; Yin, X.; Tian, P.; Wang, X., Wafer-scale synthesis of ultrathin CoO nanosheets with enhanced electrochemical catalytic properties. *Journal of Materials Chemistry A* 2017, 5 (19), 9060-9066; Guo, D.; Chen, F.; Zhang, W.; Cao, R., Phase-transfer synthesis of α-Co(OH)2 and its conversion to CoO for efficient electrocatalytic water oxidation. *Science Bulletin* 2017, 62 (9), 626-632; Zhao, Y.; Sun, B.; Huang, X.; Liu, H.; Su, D.; Sun, K.; Wang, G., Porous graphene wrapped CoO nanoparticles for highly efficient oxygen evolution. *Journal of Materials Chemistry A* 2015, 3 (10), 5402-5408; and Chou, N. H.; Ross, P. N.; Bell, A. T.; Tilley, T. D., Comparison of Cobalt-based Nanoparticles as Electrocatalysts for Water Oxidation. *ChemSusChem* 2011, 4 (11), 1566-1569, each incorporated herein by reference in their entirety] are preferable because of their high catalytic activity, environmentally benign nature, and low cost due to earth abundance.

It has been shown that the catalytic activity of CoO is dependent upon in-situ generated surface Co—O(H) sites [Tang, C.; Cheng, N.; Pu, Z.; Xing, W.; Sun, X., NiSe Nanowire Film Supported on Nickel Foam: An Efficient and Stable 3D Bifunctional Electrode for Full Water Splitting. *Angewandte Chemie International Edition* 2015, 54 (32), 9351-9355, incorporated herein by reference in its entirety], which are related to surface structure, number of active sites, and conductivity of the CoO materials [Jin, H.; Wang, J.; Su, D.; Wei, Z.; Pang, Z.; Wang, Y., In situ Cobalt-Cobalt Oxide/N-Doped Carbon Hybrids As Superior Bifunctional Electrocatalysts for Hydrogen and Oxygen Evolution. *Journal of the American Chemical Society* 2015, 137 (7), 2688-2694, incorporated herein by reference in its entirety]. To improve the catalytic performance of CoO-catalysts, several strategies such as lowering the size and dimensionality, doping with heteroatoms, introducing defects to the microstructures and designing synergistic composites have been employed. For instance, surface structure engineering was used to create desired nanofacets and defects in single crystal CoO nanorods [Ling, T.; Yan, D.-Y.; Jiao, Y.; Wang, H.; Zheng, Y.; Zheng, X.; Mao, J.; Du, X.-W.; Hu, Z.; Jaroniec, M.; Qiao, S.-Z., Engineering surface atomic structure of single-crystal cobalt (II) oxide nanorods for superior electrocatalysis. *Nature Communications* 2016, 7, 12876, incorporated herein by reference in its entirety]. It was demonstrated that the oxygen vacancies on the nanofacets were responsible for providing electronic properties including rapid charge transfer and favorable kinetics for water splitting of the resulting material.

Because of their shape-dependent physiochemical attributes, efforts have been made to control the multidimensional structures of water oxidation catalysts. The assembly of hierarchical structures is driven by interactions such as van der Waals, magnetic, and electrostatic interactions among the preformed or transitioning building blocks, thereby decreasing the overall energy of the system during the self-organization and yielding specific geometric configurations [Min, Y.; Akbulut, M.; Kristiansen, K.; Golan, Y.; Israelachvili, J., The role of interparticle and external forces in nanoparticle assembly, *Nat Mater* 2008, 7 (7), 527-38, incorporated herein by reference in its entirety].

The enhanced mass transfer and transport of electrolytes of the resulting hierarchical porous structure during the catalytic process promotes the catalytic efficiency [Zhu, Y. P.; Guo, C.; Zheng, Y.; Qiao, S.-Z., Surface and Interface Engineering of Noble-Metal-Free Electrocatalysts for Efficient Energy Conversion Processes. *Accounts of Chemical Research* 2017, 50 (4), 915-923; Zhao, B.; Zhang, L.; Zhen, D.; Yoo, S.; Ding, Y.; Chen, D.; Chen, Y.; Zhang, Q.; Doyle, B.; Xiong, X.; Liu, M., A tailored double perovskite nanofiber catalyst enables ultrafast oxygen evolution. *Nature Communications* 2017, 8, 14586; and Liang, Y.; Yu, Y.; Huang, Y.; Shi, Y.; Zhang, B., Adjusting the electronic structure by Ni incorporation: a generalized in situ electrochemical strategy to enhance water oxidation activity of oxyhydroxides. *Journal of Materials Chemistry A* 2017, 5 (26), 13336-13340, each incorporated herein by reference in their entirety] while retaining advantages of the lower dimensional structures. As shown by Liang et al., charge transfer in 3D structures can also be enhanced if a significant number of oxygen defects is introduced [Liang, Z.; Huang, Z.; Yuan, H.; Yang, Z.; Zhang, C.; Xu, Y.; Zhang, W.; Zheng, H.; Cao, R., Quasi-single-crystalline CoO hexagrams with abundant defects for highly efficient electrocatalytic water oxidation. *Chemical Science* 2018, 9 (34), 6961-6968, incorporated herein by reference in its entirety].

However, because of the complexity of growth mechanisms, simultaneous generation of defects and long-range structural ordering in a hierarchical material with controlled morphology remains challenging [Ni, X.; Li, D.; Zhang, Y.; Zheng, H., Complexant-assisted Fabrication of Flowery Assembly of Hexagonal Close-packed Cobalt Nanoplatelets. *Chemistry Letters* 2007, 36 (7), 908-909; and Li, H.; Liao, S., Synthesis of flower-like Co microcrystals composed of Co nanoplates in water/ethanol mixed solvent. *Journal of Physics D: Applied Physics* 2008, 41 (6), 065004, each incorporated herein by reference in their entirety]. A limited number of CoO hierarchical structures [Huo, M.; Yang, Z.; Yang, C.; Gao, Z.; Qi, J.; Liang, Z.; Liu, K.; Chen, H.; Zheng, H.; Cao, R., Hierarchical Zn-Doped CoO Nanoflowers for Electrocatalytic Oxygen Evolution Reaction. *ChemCatChem* 2019, 11 (5), 1480-1486; Gao, X.; Zhang, H.; Li, Q.; Yu, X.; Hong, Z.; Zhang, X.; Liang, C.; Lin, Z., Hierarchical NiCo2O4 Hollow Microcuboids as Bifunctional Electrocatalysts for Overall Water-Splitting. *Angewandte Chemie International Edition* 2016, 55 (21), 6290-6294; and Yin, Z.; Zhu, C.; Li, C.; Zhang, S.; Zhang, X.; Chen, Y., Hierarchical nickel-cobalt phosphide yolk-shell spheres as highly active and stable bifunctional electrocatalysts for overall water splitting. *Nanoscale* 2016, 8 (45), 19129-19138, each incorporated herein by reference in their entirety] employed for water oxidation has been reported. Furthermore, hierarchical structures are prone to collapse when subjected to heating and/or ultrasonication, which is often required to redeposit the synthesized hierarchical materials over the electrodes. Consequently, the use of hierarchical materials in a nanodevice becomes difficult [Wang, X.; Yuan, F.; Hu, P.; Yu, L.; Bai, L., Self-Assembled Growth of Hollow Spheres with Octahedron-like Co Nanocrystals via One-Pot Solution Fabrication. *The Journal of Physical Chemistry C* 2008, 112 (24), 8773-8778, incorporated herein by reference in its entirety]. Direct deposition of these materials onto electrode substrates promotes in situ assembly of hierarchical structures, which is a more desirable approach.

These hierarchical structures are typically synthesized via a hydrothermal or solvothermal procedure that requires an extended reaction time. In addition, the control of dimensionality often requires tedious synthetic procedures, expensive instrumentation, and complicated variations of temperature. For instance, Huo et al. [Huo, M.; Yang, Z.; Yang, C.; Gao, Z.; Qi, J.; Liang, Z.; Liu, K.; Chen, H.; Zheng, H.; Cao, R., Hierarchical Zn-Doped CoO Nanoflowers for Electrocatalytic Oxygen Evolution Reaction. *ChemCatChem* 2019, 11 (5), 1480-1486, incorporated herein by reference in its entirety] reported hierarchical CoO nanoflowers doped with Zn for electrocatalytic OER prepared via a 12-hour solvothermal synthetic procedure in a Teflon-lined stainless-steel autoclave and a 3 hour calcination in argon atmosphere.

In view of the forgoing, one objective of the present disclosure is to provide a thin film electrode having a nanostructured layer of cobalt oxide nanoflowers deposited onto a conducting substrate, and a method for making thereof. The thin film electrode may be used in an electrochemical cell for producing hydrogen and oxygen gases.

BRIEF SUMMARY OF THE INVENTION

According to a first aspect, the present disclosure relates to a thin film electrode, which includes a conducting substrate, and a nanostructured layer comprising cobalt oxide nanoflowers deposited onto a surface of the conducting substrate.

In one embodiment, the cobalt nanoflowers have a central core and a plurality of nanopetals extending from the central core, and wherein the nanopetals have an average diameter in a range of 10-100 nm and an average length in a range of 20-200 nm In one embodiment, the cobalt oxide nanoflowers have an average particle size in a range of 200-800 nm.

In one embodiment, the cobalt oxide nanoflowers consist essentially of crystalline CoO.

In a further embodiment, the cobalt oxide nanoflowers exhibit exposed CoO {111} facets.

In one embodiment, the conducting substrate is selected from the group consisting of fluorine-doped tin oxide, indium tin oxide, aluminum-doped zinc oxide, gallium-doped zinc oxide, indium zinc oxide, indium zinc tin oxide, indium aluminum zinc oxide, indium gallium zinc oxide, indium gallium tin oxide, and antimony tin oxide.

In one embodiment, the conducting substrate is fluorine-doped tin oxide.

According to a second aspect, the present disclosure relates to a method of producing the thin film electrode of the first aspect. The method involves contacting an aerosol with the conducting substrate to deposit the nanostructured layer onto the conducting substrate, thereby forming the thin film electrode. The aerosol contains a carrier gas and a cobalt complex dissolved in a solvent. The conducting substrate has a temperature in a range of 400-550° C. during the contacting.

In one embodiment, the cobalt complex is Co(II) acetylacetone, and the solvent is methanol.

In one embodiment, a weight ratio of the cobalt complex to the solvent in the aerosol is in a range of 1:200 to 1:2.

In one embodiment, the aerosol is contacted with the conducting substrate for a time period of 0.75-3 hours.

In one embodiment, the carrier gas has a flow rate in a range of 25-250 $cm^3$/min.

According to a third aspect, the present disclosure relates to an electrochemical cell including the thin film electrode of the first aspect, a counter electrode, and an electrolyte solution containing water and a base in contact with both the thin film electrode and the counter electrode.

In one embodiment, the electrolyte solution has a pH of 9-14.

In one embodiment, the thin film electrode has an overpotential in a range of 310-340 mV at a current density of 9-11 $mA/cm^2$.

In one embodiment, the thin film electrode has a current density of 100-250 $mA/cm^2$ when the electrochemical cell is subjected to a bias potential of 1.65-1.75 V.

In one embodiment, the thin film electrode has a mass activity of 30-40 A/g.

In one embodiment, the thin film electrode has a Tafel slope in a range of 90-105 mV/decade.

According to a fourth aspect, the present disclosure relates to a method of splitting water into $H_2$ and $O_2$. The method involves subjecting the electrochemical cell of the third aspect to a potential of 0.5 to 2.0 V.

In one embodiment, the method further involves separately collecting $H_2$-enriched gas and $O_2$-enriched gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
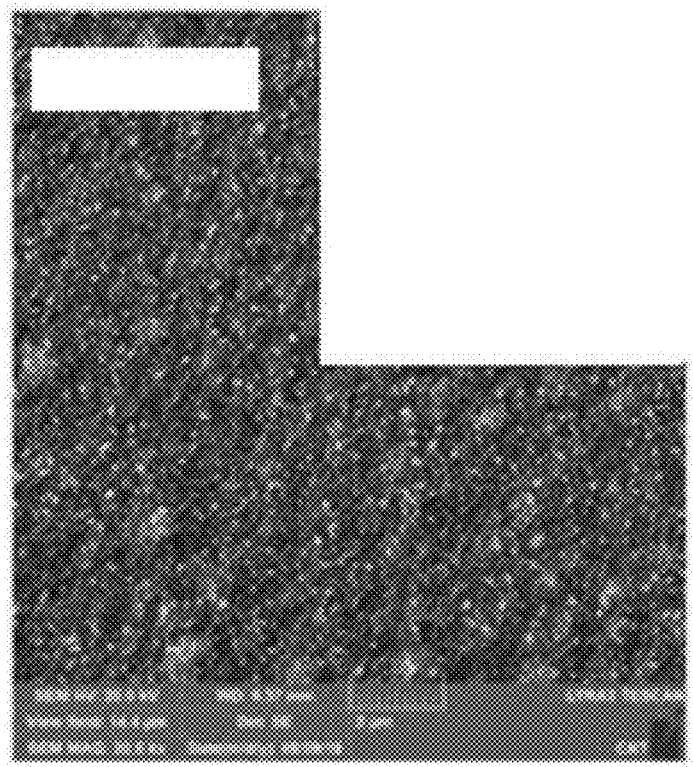
FIG. 1A is a large area, low resolution field emission scanning electron microscope (FESEM) image of the CoO—NP film.

Embodiments of the present disclosure will now be described more fully hereinafter with reference to the accompanying drawings, in which some, but not all embodiments of the disclosure are shown.

The present disclosure may be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Although the open-ended term "comprising," as a synonym of terms such as including, containing, or having, is use herein to describe and claim the present composition and methods, the composition and/or methods may alternatively be described using more limiting terms, such as "consisting of" or "consisting essentially of" the recited components/steps. For example, an electrode composition which consists essentially of the recited components may contain other components which do not adversely affect the electrochemical properties of the composition.

As used herein, the words "about" or "substantially similar" may be used when describing magnitude and/or position to indicate that the value and/or position described is within a reasonable range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

The present disclosure further includes all isotopes of atoms occurring in the present compounds. Isotopes include those atoms having the same atomic number but different mass numbers. By way of general example, and without limitation, isotopes of hydrogen include deuterium and tritium, isotopes of oxygen include $^{16}O$, $^{17}O$ and $^{18}O$, and isotopes of cobalt include $^{56}Co$, $^{57}Co$, $^{58}Co$, $^{59}Co$, and $^{60}Co$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As defined here, an aerosol is a suspension of solid or liquid particles in a gas. An aerosol includes both the particles and the suspending gas. Primary aerosols contain particles introduced directly into the gas, while secondary aerosols form through gas-to-particle conversion. There are several measures of aerosol concentration. Environmental science and health fields often use the mass concentration (M), defined as the mass of particulate matter per unit volume with units such as $\mu g/m^3$. Also commonly used is the number concentration (N), the number of particles per unit volume with units such as $number/m^3$ or $number/cm^3$. The size of particles has a major influence on their properties, and the aerosol particle radius or diameter ($d_p$) is a key property used to characterize aerosols. Aerosols vary in their dispersity. A monodisperse aerosol, producible in the laboratory, contains particles of uniform size. Most aerosols, however, as polydisperse colloidal systems, exhibit a range of particle sizes. Liquid droplets are almost always nearly spherical, but scientists use an equivalent diameter to characterize the properties of various shapes of solid particles, some very irregular. The equivalent diameter is the diameter of a spherical particle with the same value of some physical property as the irregular particle. The equivalent volume diameter ($d_e$) is defined as the diameter of a sphere of the same volume as that of the irregular particle. Also commonly used is the aerodynamic diameter. The aerodynamic diameter of an irregular particle is defined as the diameter of the spherical particle with a density of 1000 $kg/m^3$ and the same settling velocity as the irregular particle.

According to a first aspect, the present disclosure relates to a thin film electrode, which includes a conducting substrate, and a nanostructured layer comprising cobalt oxide particles deposited onto a surface of the conducting substrate.

A particle is defined as a small object that behaves as a whole unit with respect to its transport and properties. An average diameter (e.g., average particle size) of the particle, as used herein, and unless otherwise specifically noted, refers to the average linear distance measured from one point on the particle through the center of the particle to a point directly across from it. For polygonal shapes, the term "diameter", as used herein, and unless otherwise specified, refers to the greatest possible distance measured from a vertex of a polygon through the center of the face to the vertex on the opposite side. For a circle, an oval, an ellipse, and a multilobe, "diameter" refers to the greatest possible distance measured from one point on the shape through the center of the shape to a point directly across from it.

The nanostructured layer of the presently disclosed thin film electrode comprises cobalt oxide in the form of particles of the same shape or different shapes, and of the same size or different sizes. In preferred embodiments, the cobalt oxide particles are in the form of nanoflowers having a central core and a plurality of nanopetals extending from a surface of the central core.

In one embodiment, the central core of the cobalt oxide nanoflowers has a spherical or substantially spherical shape (e.g., oval or oblong shape). As defined here, the term "substantially spherical" means that the standard deviation of the distance from anywhere on the outer surface to the central core of the particle (center of mass) varies by less than 30%, preferably by less than 20%, more preferably by less than 10% of the average distance. Alternatively, the central core of the cobalt oxide nanoflowers is block-shaped. For example, the central core may be in the form of a cube, a cuboid, a hexagonal prism, a triangular prism, a triangular-based pyramid, a square-based pyramid, or other polyhedron shapes.

The cross-section of the nanorods present in the cobalt oxide nanoflowers may be of any desired shape, such as a circle, an oval, an ellipse, a multilobe, and a polygon. In a preferred embodiment, the cross-section of the nanorods is oval shaped. In another preferred embodiment, the cross-section of the cobalt oxide nanorods is polygonal shaped.

Figure 1F:
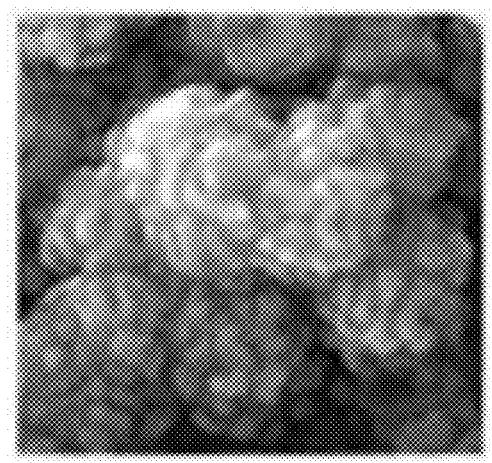
FIG. 1F is a high resolution FESEM image of the CoO—NF film.
Figure 2A:
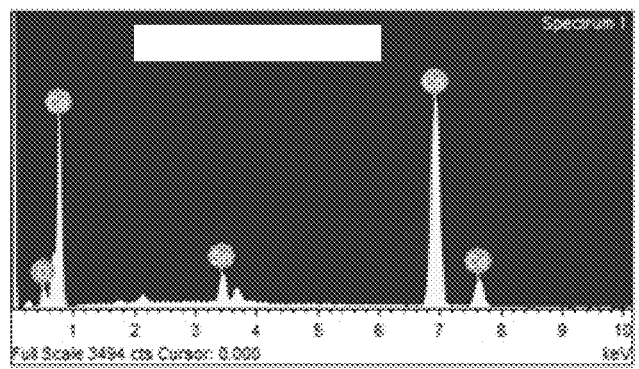
FIG. 2A is an energy dispersive X-ray (EDX) spectrum of the CoO—NP film.
Figure 2B:
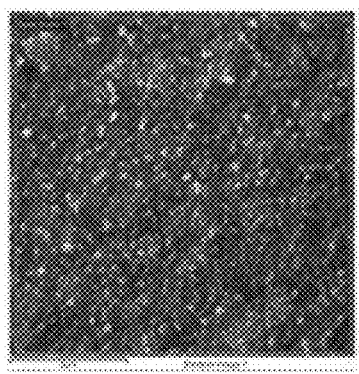
FIG. 2B is a scanning electron microscope (SEM) image of the CoO—NP film (scale bar: 2 μm).
Figure 2C:
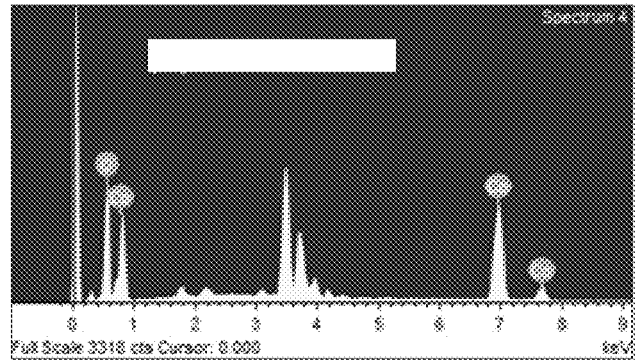
FIG. 2C is an EDX spectrum of the CoO—NB film.
Figure 2D:
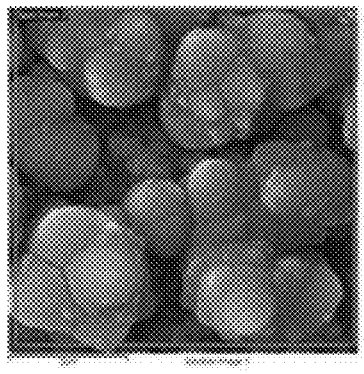
FIG. 2D is a SEM image of the CoO—NB film (scale bar: 2 μm).
Figure 2E:
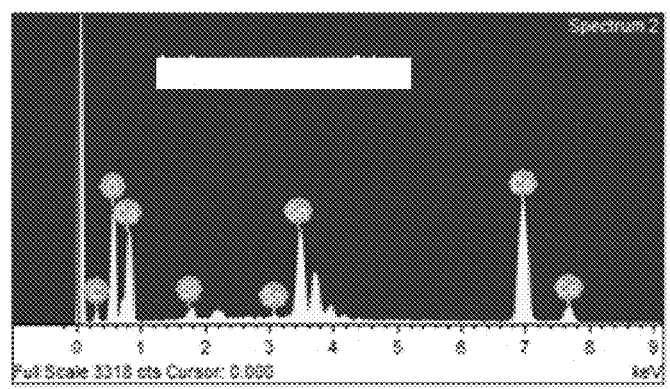
FIG. 2E is an EDX spectrum of the CoO—NF film.
Figure 2F:
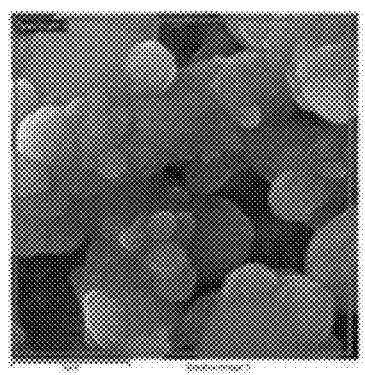
FIG. 2F is a SEM image of the CoO—NF film (scale bar: 1 μm).

Nanopetals, also termed herein as nanorods, are a one-dimensional nanostructure. The cross-section of the nanopetals present in the cobalt oxide nanoflowers may be constant over the length of the nanopetals or may vary over the length. In a preferred embodiment, the nanopetals present in the cobalt oxide nanoflowers have a globular shape possessing an uneven surface. The FESEM images of FIGS. 1F and 2F show examples of cobalt oxide particles that are cobalt oxide nanoflowers having nanopetals.

In an alternative embodiment, the nanopetals may be rod-shaped. In a related embodiment, the nanopetals are uniform throughout the entire length of the nanopetals and are of a cylindrical shape. In another embodiment, the nanopetals are conical-shaped or elongated oval-shaped (cigar-shaped). Alternatively, the nanopetals have oval or polygonal shaped cross-sections with diameters that taper along the length of the nanorod to a rounded tip.

As defined herein, a diameter of a nanopetal is measured at the point along the nanorod where the cross section is the widest. An average diameter of the nanopetals refers to the average of diameters of each nanopetals present in the cobalt oxide nanoflowers. In one or more embodiments, the nanopetals have an average diameter of 10-100 nm, preferably 15-80 nm, preferably 20-60 nm, preferably 25-50 nm, preferably 30-40 nm. However, in certain embodiments, the average diameter of the nanopetals is less than 10 nm, or greater than 100 nm. In one or more embodiments, the nanopetals have an average length of 20-200 nm, preferably 25-180 nm, preferably 30-160 nm, preferably 35-140 nm, preferably 40-120 nm, preferably 50-100 nm, preferably 55-90 nm, preferably 60-80 nm. However, in certain embodiments, the average length of the nanopetals is less than 20 nm, or greater than 200 nm.

As used herein, nanoflowers are particles exhibiting a characteristic three-dimensional flower-like morphology. The nanopetals may extend 1-100 nm from a surface of the central core of the cobalt oxide nanoflowers, preferably 5-50 nm, more preferably 10-25 nm from the surface of the central core of the cobalt oxide nanoflowers. The nanopetals may traverse a surface of the central core of the cobalt oxide nanoflowers with lengths of 20-200 nm, preferably 25-180 nm, preferably 30-160 nm, preferably 35-140 nm, preferably 40-120 nm, preferably 50-100 nm, preferably 55-90 nm, preferably 60-80 nm. Preferably, the cobalt oxide nanoflowers have a plurality of nanopetals arranged radially from the central core. Specifically, individual nanopetals of a cobalt oxide nanoflower may be arranged radially like petals, wherein two or more adjacent individual nanorods are interconnected to form channels which open onto external environment of the nanoflower.

In one embodiment, 50-100%, preferably 60-99%, preferably 70-97%, preferably 80-95%, preferably 85-90% of the outer surface of the central core of the cobalt oxide nanoflowers is covered with nanopetals. In alternative embodiments, a cobalt oxide nanoflower may have a lower coverage of nanopetals.

In some embodiments, the cobalt oxide nanoflowers described herein may be called "microflowers".

It is equally envisaged that other cobalt oxide particles having different morphologies including, but not limited to, cobalt oxide nanoparticles (e.g., nanospheres, see FIGS. 1A-B, 2B) and cobalt oxide nanobuds (see FIGS. 1C-D, 2D) may be present in addition to, or in lieu of the cobalt oxide nanoflowers in the nanostructured layer of the thin film electrode disclosed herein. As used herein, nanobuds refer to particles having budding flower-like morphologies. Similar to nanoflowers, nanobuds have a central core and nanopetals extending from a surface of the central core. However, the nanopetals of a nanobud particle are typically smaller and more closely interconnected than those of a nanoflower (FIGS. 1F, 2F vs. FIGS. 1D, 2D). In at least one embodiment, the nanostructured layer of the thin film electrode is substantially free of the cobalt oxide nanoparticles and the cobalt oxide nanobuds.

The cobalt oxide particles (e.g., cobalt oxide nanoflowers) may have an average particle size in a range of 150-1,000 nm, 200-900 nm, 220-800 nm, 240-700 nm, 260-600 nm, 280-500 nm, 300-400 nm, or 350-375 nm. The cobalt oxide particles may be agglomerated or non-agglomerated (i.e., the cobalt oxide particles are well separated from one another and do not form clusters). As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the cobalt oxide particles having an average particle size as those previously described. In one embodiment, the cobalt oxide particles are agglomerated and the agglomerates have an average diameter in a range of 0.5-10 µm, 1-8 µm, or 2-5 µm.

Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value $|\mu|$). The CV or RSD is widely used to express precision and repeatability. It shows the extent of variability in relation to the mean of a population. The cobalt oxide particles having a narrow size dispersion, i.e., monodispersity, is preferred. As used herein, "monodisperse", "monodispersed" and/or "monodispersity" refers to particles having a CV or RSD of less than 25%, preferably less than 20%, preferably less than 10%, preferably less than 8%, preferably less than 6%, preferably less than 5%. The cobalt oxide particles may be monodisperse with a coefficient of variation or relative standard deviation (ratio of the particle size standard deviation to the particle size mean) of less than 15%, less than 12%, less than 10%, less than 9%, less than 8%, less than 7%, less than 6%, less than 5%, or preferably less than 2%. In another embodiment, the cobalt oxide particles are not monodisperse.

When referencing particles compositions, the phrase "substantially free", unless otherwise specified, describes an amount of a particular component present in the particles being less than about 1 wt. %, preferably less than about 0.5 wt. %, more preferably less than about 0.1 wt. %, even more preferably less than about 0.05 wt. %, yet even more preferably 0 wt. %, relative to a total weight of the particles.

In one embodiment, the cobalt oxide particles (e.g., cobalt oxide nanoflowers) consist essentially of CoO. As defined here, the cobalt oxide particles consisting essentially of CoO means that 95-100%, preferably 96.0-99.7%, more preferably 97.5-99.5% of the mass of cobalt oxide particles is CoO. Where the cobalt oxide particles consist of less than 100% CoO, the cobalt oxide particles may have adsorbed, reacted, or incorporated contaminants, for instance from gas molecules, other metals or metal oxides, or organic compounds. Alternatively, the cobalt oxide particles may contain $Co_2O_3$ and/or $Co_3O_4$ in addition to or in lieu of CoO. Preferably, the cobalt oxide nanoflowers are substantially free of $Co_2O_3$ and $Co_3O_4$.

In at least one embodiment, the nanostructured layer disclosed herein is substantially free of dopants, which includes being substantially free of, preferably completely free of (i.e., 0 wt. %) dopants. Exemplary dopants include, but are not limited to, zinc, lithium, and vanadium.

The cobalt oxide particles (e.g., cobalt oxide nanoflowers) may comprise CoO in the form of an amorphous phase, a crystalline phase, or both. Preferably, the cobalt oxide particles comprise or consist essentially of crystalline CoO. The amount of crystalline CoO may be measured by X-ray diffraction patterns. In one embodiment, the nanostructured layer consists essentially of crystalline CoO, meaning that the nanostructured layer comprises at least 99 wt %, preferably 99.9 wt %, more preferably 99.95 wt % CoO in a crystalline state, relative to a total weight of the nanostructured layer. In a further embodiment, the cobalt oxide nanoflowers exhibit exposed CoO {111} facets.

A ratio of a surface area of the exposed {111} CoO facets to a total surface area of the cobalt oxide particles may be in a range of 20-99%. In some embodiments, cobalt oxide particles are present in the form of nanoflowers, and a ratio of a surface area of the exposed {111} CoO facets to a total surface area of the cobalt oxide nanoflowers described herein is in a range of 60-99%, preferably 65-95%, more preferably 70-90%, even more preferably 75-85%. In a related embodiment, cobalt oxide particles are present in the form of nanobuds, and a ratio of a surface area of the exposed {111} CoO facets to a total surface area of the cobalt oxide nanobuds is at least 25% less, preferably 30-50% less, more preferably 40-45% less than the ratio of a surface area of the exposed {111} CoO facets to a total surface area of the cobalt oxide nanoflowers. In another related embodiment, cobalt oxide particles are present in the form of nanoparticles (e.g., nanospheres), and a ratio of a surface area of the exposed {111} CoO facets to a total surface area of the cobalt oxide nanoparticles is at least 50% less, preferably 55-75% less, more preferably 60-70% less than the ratio of a surface area of the exposed {111} CoO facets to a total surface area of the cobalt oxide nanoflowers. Methods of determining ratio of exposed CoO {111} facets to a total surface area of cobalt oxide particles are known by those of ordinary skill in the art. For example, the ratio can be determined using geometric computational models (e.g., density functional theory (DFT) calculation), and imaging tools with atomic resolution.

Importantly, the enhancement of CoO {111} facet can have a significant impact on the electrocatalytic behavior of the film towards OER reaction. Ling et al. [Ling, T.; Yan, D.-Y.; Jiao, Y.; Wang, H.; Zheng, Y.; Zheng, X.; Mao, J.; Du, X.-W.; Hu, Z.; Jaroniec, M.; Qiao, S.-Z., Engineering surface atomic structure of single-crystal cobalt (II) oxide nanorods for superior electrocatalysis. *Nature Communications* 2016, 7, 12876, incorporated herein by reference in its entirety] and others [Wang, D.; Ma, X.; Wang, Y.; Wang, L.; Wang, Z.; Zheng, W.; He, X.; Li, J.; Peng, Q.; Li, Y., Shape control of CoO and $LiCoO_2$ nanocrystals. *Nano Research* 2010, 3 (1), 1-7, incorporated herein by reference in its entirety] have shown that the surface energy of CoO {111} facet is much higher than that of other low-indexed facets. A higher percentage of these high energy facets are difficult to achieve. However, the presently disclosed AACVD approach for growing hierarchical structures has resulted in a significant enhancement of these CoO {111} facets. The facets with high surface energy can also have higher number of defects or oxygen vacancies which are highly desirable for catalysis [Liang, Z.; Huang, Z.; Yuan, H.; Yang, Z.; Zhang, C.; Xu, Y.; Zhang, W.; Zheng, H.; Cao, R., Quasi-single-crystalline CoO hexagrams with abundant defects for highly efficient electrocatalytic water oxidation. *Chemical Science* 2018, 9 (34), 6961-6968; and Jiang, A.; Nidamanuri, N.; Zhang, C.; Li, Z., Ionic-Liquid-Assisted One-Step Synthesis of CoO Nanosheets as Electrocatalysts for Oxygen Evolution Reaction. *ACS Omega* 2018, 3 (8), 10092-10098, each incorporated herein by reference in their entirety].

To further probe the local chemical and electronic environment on the surface of cobalt oxide particles, X-ray photoelectron spectroscopy (XPS) measurements were performed. FIGS. 4C and 4D are high resolution 0 is spectra of cobalt nanoparticles (CoO—NP) and cobalt nanoflowers (CoO—NF), respectively with de-convoluted peaks I, II, and III. Low binding energy peak I represents lattice oxygen. Middle binding energy peak II represents the number of oxygen defect sites where the oxygen coordination is low. High binding energy peak III represents the hydroxy species of water molecules that are adsorbed onto the surface in both CoO—NP and CoO—NF. This is a characteristic feature for 0 that is bonded to a metal in metal oxides.

In one embodiment, cobalt oxide particles present in the form of nanoparticles (e.g., nanospheres) have a ratio of middle binding energy peak area (i.e., peak II area of FIG. 4C) relative to low binding energy peak area (i.e., peak I area of FIG. 4C) that is at least 20% less, preferably 25-50% less, more preferably 30-40% less than a ratio of middle binding energy peak area (i.e., peak II area of FIG. 4D) relative to low binding energy peak area (i.e., peak I area of FIG. 4D) of cobalt oxide particles in the form of nanoflowers. The larger peak II area of CoO—NF than CoO—NP indicates that the number of oxygen defect sites increases while moving from CoO—NP to CoO—NF. This clearly demonstrates that higher dimensional material formed via AACVD possesses a larger number of 0-vacancies on the surface, which can lead to better catalytic performance for water oxidation reactions.

In one or more embodiments, the aforementioned nanostructured layer comprising the cobalt oxide particles (e.g., cobalt oxide nanoflowers) is deposited onto a surface of a conducting substrate. The nanostructured layer may be adsorbed on the surface (e.g. by van der Waals and/or electrostatic forces) of the conducting substrate.

The cobalt oxide particles (e.g., cobalt oxide nanoflowers) are evenly arranged on the surface of the conducting substrate, i.e. a distance between a cobalt oxide particle and all its neighbors is the same or substantially the same. The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a cobalt oxide particle to a center of a neighboring cobalt oxide particle and may be in a range of 10 nm to 2 µm, 20-1,000 nm, 50-750 nm, 100-500 nm, or 200-300 nm. Alternatively, the cobalt oxide particles are randomly arranged on the surface of the conducting substrate, i.e., distances between a cobalt oxide particle and its neighboring cobalt oxide particle are different.

In one or more embodiments, the cobalt oxide particles are present on the surface of the conducting substrate at a density of 5-200/µm$^2$, 10-150/µm$^2$, 25-100/µm$^2$, or 50-80/µm$^2$. In a related embodiment, when cobalt oxide particles are present in the form of nanoflowers, these particles are present on the surface of the conducting substrate at a density that is at least 3 times greater than cobalt oxide particles in the form of nanobuds, preferably 4-20 times greater, more preferably 6-10 times greater than cobalt oxide particles in the form of nanobuds (FIG. 1E verses FIG. 1E).

Energy-dispersive X-ray spectroscopy, X-ray microanalysis, elemental mapping, transmission electron microscopy, scanning electron microscopy, and scanning transmission electron microscopy may be useful techniques for observing the arrangement and coverage density of the cobalt oxide particles on the conducting substrate.

Exemplary substrates include fluorine doped tin oxide (FTO) film, indium tin oxide (ITO) film, ITO coated polyethylene terephthalate (PET) film, a gold film, gold coated glass, aluminum oxide, titanium oxide, nickel oxide, tungsten oxide, strontium titanate, quartz, and silicon wafer. In a preferred embodiment, the conducting substrate is selected from the group consisting of FTO (fluorine-doped tin oxide), ITO (indium tin oxide), AZO (aluminum-doped zinc oxide), GZO (gallium-doped zinc oxide), IZO (indium zinc oxide), IZTO (indium zinc tin oxide), IAZO (indium aluminum zinc oxide), IGZO (indium gallium zinc oxide), IGTO (indium gallium tin oxide), and ATO (antimony tin oxide). In a most preferred embodiment, the conducting substrate is fluorine-doped tin oxide. The conducting substrate may be of any desirable shape, such as, a circle, a triangle, a rectangle, a pentagon, a hexagon, an irregular polygon, a circle, an oval, an ellipse, or a multilobe. Preferably, the conducting substrate is rectangular in shape with a length and width of 0.5-5 cm, 1-4 cm, or 2-3 cm, respectively. The conducting substrate may have an area in a range of 0.25-25 cm$^2$, preferably 0.5-5 cm$^2$, more preferably about 2 cm$^2$. Preferably the conducting substrate is attached to an additional support, such as a glass slide.

The nanostructured layer deposited on the conducting substrate may have an average thickness in a range of 0.5-5 µm, preferably 0.7-4 µm, more preferably 0.8-3 µm, even more preferably 0.9-2 µm, or about 1 µm. In one embodiment, the thickness of the nanostructured layer may vary from location to location on the thin film electrode by 1-30%, 5-20%, or 8-10% relative to the average thickness of the nanostructured layer. In a preferred embodiment, 70-100%, more preferably 80-99%, even more preferably 85-97% of the surface of the conducting substrate is covered with the nanostructured layer, though in some embodiments, less than 70% of the surface of the conducting substrate is covered with the nanostructured layer.

In one embodiment, the thin film electrode of the present disclosure has an electrochemically active surface area (ECSA, or electroactive surface area) in a range of 800-1,500 µF, preferably 900-1,400 µF, more preferably 1,000-1,200 µF, or about 1069 µF.

According to a second aspect, the present disclosure relates to a method of producing the thin film electrode of the first aspect. This method involves contacting an aerosol with the conducting substrate to deposit the nanostructured layer onto the conducting substrate, thereby forming the thin film electrode. As described here, "contacting an aerosol with a conducting substrate" is considered to be synonymous with "contacting a conducting substrate with an aerosol." Both phrases mean that the conducting substrate is exposed to the aerosol, so that a portion of the suspended particles of the aerosol directly contact the conducting substrate. Contacting may also be considered equivalent to "introducing" or "depositing," such as "depositing an aerosol onto a conducting substrate." In one embodiment, the contacting may be considered aerosol-assisted chemical vapor deposition (AACVD). In one embodiment, the method of making the thin film electrode may be considered a one-step method, as the formation of the nanostructured layer takes place immediately following and/or during the contacting of the aerosol with the conducting substrate.

The aerosol contains a carrier gas, a cobalt complex, and a solvent. In one embodiment, the aerosol consists of, or consists essentially of, a carrier gas, a cobalt complex, and a solvent before the contacting, preferably immediately before the contacting. Preferably, the cobalt complex is dissolved or dispersed in the solvent.

In one embodiment, the cobalt complex has an acetylacetone or acetylacetonate (acac) ligand, a trifluoroacetate (TFA) ligand, an acetate ligand (OAc), an isopropanol ($^i$PrOH) ligand, a tetrahydrofuran (THF) ligand, and/or a water ($H_2O$) ligand. In one embodiment, a molar ratio of acetylacetonate ligands to Co in the cobalt complex is in a range of 1:1-3:1, or about 2:1. In one embodiment, the cobalt complex is Co(II) acetylacetonate, or Co(acac)$_2$. In alternative embodiments, the cobalt complex may be bromopentaamminecobalt(III) bromide, caesium hexafluorocobaltate (IV), chloro(pyridine)cobaloxime, chloropentamminecobalt chloride, cis-dichlorobis(ethylenediamine)cobalt(III) chloride, trans-dichlorobis(ethylenediamine)cobalt(III) chloride, hexamminecobalt(III) chloride, nitropentaamminecobalt (III) chloride, tetracobalt dodecacarbonyl, tris(ethylenediamine)cobalt(III) chloride or some other cobalt complex or cobalt salt. In these alternative embodiments, the cobalt may have a (II), (III), or (IV) oxidation state.

Exemplary solvents applicable to the method disclosed herein include, but are not limited to, toluene, tetrahydrofuran, acetic acid, acetone, acetonitrile, butanol, dichloromethane, chloroform, chlorobenzene, dichloroethane, diethylene glycol, diethyl ether, dimethoxy-ethane, dimethyl-formamide, dimethyl sulfoxide, ethanol, ethyl acetate, ethylene glycol, heptane, hexamethylphosphoramide, hexamethylphosphorous triamide, methanol, methyl t-butyl ether, methylene chloride, pentane, cyclopentane, hexane, cyclohexane, benzene, dioxane, propanol, isopropyl alcohol, pyridine, triethyl amine, propandiol-1,2-carbonate, ethylene carbonate, propylene carbonate, nitrobenzene, formamide, γ-butyrolactone, benzyl alcohol, n-methyl-2-pyrrolidone, acetophenone, benzonitrile, valeronitrile, 3-methoxy propionitrile, dimethyl sulfate, aniline, n-methylformamide, phenol, 1,2-dichlorobenzene, tri-n-butyl phosphate, ethylene sulfate, benzenethiol, dimethyl acetamide, N,N-dimethylethaneamide, 3-methoxypropionnitrile, diglyme, cyclohexanol, bromobenzene, cyclohexanone, anisole, diethylformamide, 1-hexanethiol, ethyl chloroacetate, 1-dodecanthiol, di-n-butylether, dibutyl ether, acetic anhydride, m-xylene, o-xylene, p-xylene, morpholine, diisopropyl etheramine, diethyl carbonate, 1-pentandiol, n-butyl acetate, and 1-hexadecanthiol. In one embodiment, the solvent comprises pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pentane, hexane, decalin, dioxane, benzene, toluene, xylene, o-dichlorobenzene, diethyl ether, methyl t-butyl ether, methanol, ethanol, ethylene glycol, isopropanol, propanol, n-butanol, and mixtures thereof. In a preferred embodiment, the solvent is acetone, methanol, ethanol, and/or isopropanol. More preferably the solvent is methanol.

In one embodiment, the solvent may comprise water. The water used as a solvent or for other purposes may be tap water, distilled water, bidistilled water, deionized water, deionized distilled water, reverse osmosis water, and/or some other water. In one embodiment, the water is bidistilled or treated with reverse osmosis to eliminate trace metals. Preferably the water is bidistilled, deionized, deionized distilled, or reverse osmosis water, and at 25° C. has a conductivity of less than 10 $\mu S \cdot cm^{-1}$, preferably less than 1 $\mu S \cdot cm^{-1}$; a resistivity of greater than 0.1 MΩ·cm, preferably greater than 1 MΩ·cm, more preferably greater than 10 MΩ·cm; a total solid concentration of less than 5 mg/kg, preferably less than 1 mg/kg; and a total organic carbon concentration of less than 1000 µg/L, preferably less than 200 µg/L, more preferably less than 50 µg/L.

In one embodiment, the cobalt complex and the solvent are present in the aerosol at a cobalt complex to solvent weight ratio of 1:1,000-1:2, preferably 1:500-1:5, more preferably 1:200-1:10, even more preferably 1:100-1:12, or about 1:16.

In one embodiment, the carrier gas is $N_2$, He, Ar, and/or compressed air. Preferably the carrier gas is $N_2$.

Preferably the solvent and the cobalt complex are able to form an appropriately soluble solution that can be dispersed in the carrier gas as aerosol particles. For instance, the cobalt complex may first be dissolved in a volume of solvent, and then pumped through a jet nozzle in order to create an aerosol mist. In other embodiments, the mist may be generated by a piezoelectric ultrasonic generator. Other nebulizers and nebulizer arrangements may also be used, such as concentric nebulizers, cross-flow nebulizers, entrained nebulizers, V-groove nebulizers, parallel path nebulizers, enhanced parallel path nebulizers, flow blurring nebulizers, and piezoelectric vibrating mesh nebulizers.

In one embodiment, the aerosol has a mass concentration M, of 10 $\mu g/m^3$-1,000 $mg/m^3$, preferably 50 $\mu g/m^3$-1,000 $\mu g/m^3$. In one embodiment, the aerosol has a number concentration N, in a range of $10^3$-$10^6$, preferably $10^4$-$10^5$ $cm^{-3}$. In other embodiments, the aerosol may have a number concentration of less than $10^3$ or greater than $10^6$. The aerosol particles or droplets may have an equivalent volume diameter ($d_e$) in a range of 20 nm-100 μm, preferably 0.5-70 μm, more preferably 1-50 μm, though in some embodiments, aerosol particles or droplets may have an average diameter of smaller than 0.2 μm or larger than 100 μm.

In one or more embodiments, the temperature of the conducting substrate during the contacting is in a range of 400-550° C., preferably 425-525° C., more preferably 450-500° C., even more preferably 465-480° C., or about 475° C. In one embodiment, the temperature of the conducting substrate during the contacting never reaches a temperature of greater than 550° C., preferably no greater than 500° C., more preferably no greater than 480° C.

In one embodiment, during the contacting of the aerosol, the carrier gas has a flow rate in a range of 20-250 $cm^3$/min, preferably 50-230 $cm^3$/min, more preferably 75-200 $cm^3$/min, even more preferably 100-150 $cm^3$/min, or about 120 $cm^3$/min. Preferably, the aerosol has a flow rate similar to the carrier gas, with the exception of the portion of aerosol that gets deposited on the conducting substrate. In one embodiment, the aerosol may enter the chamber and the flow rate may be stopped, so that a portion of aerosol may settle on the conducting substrate.

The contacting and/or introducing may take place within a closed chamber or reactor, and the aerosol may be generated by dispersing a solution of the cobalt complex and solvent. In one embodiment, this dispersing may be increased by fans, jets, or pumps. However, in another embodiment, an aerosol may be formed in a closed chamber with a conducting substrate where the aerosol particles are allowed to diffuse towards or settle on the substrate. In one embodiment, the closed chamber or reactor may have a length of 10-100 cm, preferably 12-30 cm, and a diameter or width of 1-10 cm, preferably 2-5 cm. In other embodiments, the closed chamber or reactor may have an interior volume of 0.2-100 L, preferably 0.3-25 L, more preferably 0.5-10 L. In one embodiment, the closed chamber or reactor may comprise a cylindrical glass vessel, such as a glass tube.

Being in a closed chamber, the interior pressure of the chamber (and thus the pressure of the aerosol) may be controlled. The pressure may be practically unlimited, but need not be an underpressure or an overpressure. Preferably the chamber and conducting substrate are heated and held at a temperature prior to the contacting, so that the temperature may stabilize. The chamber and conducting substrate may be heated for a time period of 5 min-1 hour, preferably 10-20 min prior to the contacting.

An example AACVD setup is illustrated in FIG. 7. Here, a container of the Co(II) acetylacetonate precursor solution 12 (of solvent, cobalt complex) is connected to a carrier gas supply 10 and placed in an ultrasonic humidifier 14. Aerosol droplets 22 are transferred into a reactor tube 20. The reactor tube 20 is positioned in a tube furnace 16 and heating zones 18. The aerosol droplets 22 deposit on conducting substrate slides 24 within the reactor tube 20. To support a flow of aerosol, the reactor tube 20 is also connected to a gas trap 26 and an exhaust line 28.

In one or more embodiments, the aerosol is contacted with the conducting substrate for a time period of 0.1-3 hours, preferably 10-120 min, more preferably 15-90 min, even more preferably 30-60 min. Most preferably, the aerosol is contacted with the conducting substrate for about 45 min. As described in Example 4, a longer contacting period of about 45 minutes provides an unexpected result compared to shorter contacting periods such as 15 minutes and 30 minutes. Specifically, contacting the conducting substrate with the aerosol for about 45 minutes leads to formation of a nanostructured layer of cobalt oxide nanoflowers (i.e., CoO NF) deposited onto the substrate. On the other hand, contacting the conducting substrate with the aerosol for about 15 and about 30 minutes generates nanostructured layers having cobalt oxide nanospheres (i.e., CoO NP) and cobalt oxide nanobuds (i.e., CoO NB), respectively deposited onto the substrate. As discussed below, thin film electrodes having a nanostructured layer of cobalt oxide nanoflowers provides better electrochemical catalytic performance than those having a nanostructured layer of cobalt oxide nanospheres or nanobuds.

The method of making the thin film electrode may further comprise a step of cooling the thin film electrode after the contacting. The thin film electrode may be cooled to a temperature between 10 to 45° C., 20 to 40° C., or 25 to 35° C. under an inert gas (such as $N_2$ or Ar) over a time period of 0.5-5 h, 0.75-4 h, 1-3 h, 1.25-2.5 h, or 1.5-2 h. In one embodiment, the thin film electrode may be left in the chamber and allowed to cool.

In an alternative embodiment, the thin film electrode may be formed by lithography (e.g., nanolithography). Nanolithography techniques may be categorized as in series or parallel, mask or maskless/direct-write, top-down or bottom-up, beam or tip-based, resist-based or resist-less methods all of which are acceptable in terms of the present disclosure. Exemplary nanolithography techniques include, but are not limited to, optical lithography, photolithography, directed self-assembly, extreme ultraviolet lithography, electron beam lithography, electron beam direct write lithography, multiple electron beam lithography, nanoimprint lithography, step-and-flash imprint lithography, multiphoton lithography, scanning probe lithography, dip-pen nanolithography, thermochemical nanolithography, thermal scanning probe lithography, local oxidation nanolithography, molecular self-assembly, stencil lithography, X-ray lithography, laser printing of single nanoparticles, magnetolithography, nanosphere lithography, proton beam writing, charged particle lithography, ion projection lithography, electron projection lithography, neutral particle lithography and mixtures thereof. In another alternative embodiment, the thin film electrode may be formed by a sol-gel, solvothermal synthesis, drop-drying, spin-coating, or chemical vapor deposition method. In another alternative embodiment, the thin film electrode may be synthesized by two or more techniques, for instance, a nanolithography method and then an electrodeposition method.

According to third aspect, the present disclosure relates to an electrochemical cell including the thin film electrode of the first aspect in any of its embodiment, a counter electrode, and an electrolyte solution containing water and a base in contact with both the thin film electrode and the counter electrode. As used herein, the thin film electrode may be considered as a working electrode in the electrochemical cell.

In one embodiment, the electrochemical cell is a vessel having an internal cavity for holding the electrolyte solution. The vessel may be cylindrical, cuboid, frustoconical, spherical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop water oxidation, the internal cavity may have a volume of 100 mL-50 L, preferably 1 L-20 L, more preferably 2 L-10 L. In another embodiment, for instance, for pilot plant water oxidation, the internal cavity may have a volume of 50 L-10,000 L, preferably 70 L-1,000 L, more preferably 80 L-2,000 L. In another embodiment, for instance, for industrial plant-scale water oxidation, the internal cavity may have a volume of 10,000 L-500,000 L, preferably 20,000 L-400,000 L, more preferably 40,000 L-100,000 L. In one embodiment, one or more electrochemical cells may be connected to each other in parallel and/or in series. In another embodiment, the electrolyte solution may be in contact with more than one working electrode and/or more than one counter electrode.

In one embodiment, the counter electrode comprises gold, platinum, or carbon. In a further embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures.

In another further embodiment, where the counter electrode comprises platinum, the counter electrode is in the form of rod, wire, or a coiled wire. Alternatively, the counter electrode may comprise some other electrically-conductive material such as platinum-iridium alloy, iridium, titanium, titanium alloy, stainless steel, gold, cobalt alloy and/or some other electrically-conductive material. As defined herein, an "electrically-conductive material" is a substance with an electrical resistivity of at most $10^{-6}$ Ω·m, preferably at most $10^{-7}$ Ω·m, more preferably at most $10^{-8}$ Ω·m at a temperature of 20-25° C. In another alternative embodiment, the working electrode may not comprise FTO, but may comprise any of the previously mentioned metals.

In a preferred embodiment, the counter electrode has at least one outer surface comprising an essentially inert, electrically conducting chemical substance, such as platinum, gold, or carbon. In another embodiment, the counter electrode may comprise solid platinum, gold, or carbon. The form of the counter electrode may be generally relevant only in that it needs to supply sufficient current to the electrolyte solution to support the current required for electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode.

In a further embodiment, where the counter electrode comprises platinum, the counter electrode may be in the form of a mesh. In one embodiment, the counter electrode in the form of a mesh may have a nominal aperture or pore diameter of 0.05-0.6 mm, preferably 0.1-0.5 mm, more preferably 0.2-0.4 mm, and/or a wire diameter of 0.01-0.5 mm, preferably 0.08-0.4 mm, more preferably 0.1-0.3 mm. In other embodiments, the counter electrode may be considered a gauze with a mesh number of 40-200, preferably 45-150, more preferably 50-100. In other embodiments, the counter electrode may be in the form of a perforated sheet or a sponge.

In one embodiment, the counter electrode is in the form of a rod or wire. The rod or wire may have straight sides and a circular cross-section, similar to a cylinder. A ratio of the length of the rod or wire to its width may be 1,500:1-1:1, preferably 500:1-2:1, more preferably 300:1-3:1, even more preferably 200:1-4:1. The length of the rod or wire may be 0.5-50 cm, preferably 1-30 cm, more preferably 3-20 cm, and a long wire may be coiled or bent into a shape that allows the entire wire to fit into an electrochemical cell. The diameter of the rod or wire may be 0.5-20 mm, preferably 0.8-8 mm, more preferably 1-3 mm. In one embodiment, the diameter of the rod or wire may be smaller, for instance, with a diameter in a range of 0.1-1 mm, preferably 0.2-0.5 mm, or about 0.25 mm. In some embodiments, a rod may have an elongated cross-section, similar to a ribbon or strip of metal.

In one embodiment, the electrolyte solution contains water and a base, preferably an inorganic base, at a concentration of 0.1-1.0 M, preferably 0.2-0.8 M, more preferably 0.3-0.7 M, or about 0.5 M, though in some embodiments, the base may be present at a concentration of less than 0.1 M or greater than 1.0 M. For long term electrocatalysis, an organic base may be present at a concentration in a range of 0.05-0.5 M, preferably 0.08-0.2 M, more preferably about 0.1 M. Exemplary inorganic bases include, but are not limited to, KOH, LiOH, NaOH, Be(OH)$_2$, Mg(OH)$_2$, Ca(OH)$_2$, Sr(OH)$_2$, Ba(OH)$_2$, or some other inorganic base. Preferably the base is KOH. In an alternative embodiment, an organic base may be used, such as sodium acetate. In another alternative embodiment, an acid may be used instead of a base. In one embodiment, the electrolyte solution has a pH of 9-14, 9.5-13.5, 10-13, 10.5-12.5, 11-12, or about 11.5. In a preferred embodiment, the electrolyte solution has a pH of 13-14, 13.4-13.8, or about 13.6.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 $\mu$S·cm$^{-1}$, preferably less than 1 $\mu$S·cm$^{-1}$, a resistivity greater than 0.1 M$\Omega$·cm, preferably greater than 1 M$\Omega$·cm, more preferably greater than 10 M$\Omega$·cm, a total solid concentration less than 5 mg/kg, preferably less than 1 mg/kg, and a total organic carbon concentration less than 1000 $\mu$g/L, preferably less than 200 $\mu$g/L, more preferably less than 50 $\mu$g/L.

In one embodiment, the electrochemical cell further comprises a reference electrode in contact with the electrolyte solution. A reference electrode is an electrode which has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl), while for long term electrocatalysis, a saturated calomel electrode (Hg/HgO) was used. However, in some embodiments, the electrochemical cell does not comprise a reference electrode.

In one embodiment, the thin film electrode has an overpotential in a range of 310-340 mV, preferably 315-335 mV, more preferably 320-330 mV, or about 325 mV at a current density of 9-11 mA/cm$^2$, 9.5-10.5 mA/cm$^2$, or about 10 mA/cm$^2$. In a related embodiment, the thin film electrode has an overpotential in a range of 410-440 mV, preferably 415-435 mV, more preferably 420-430 mV, or about 425 mV at a current density of 90-110 mA/cm$^2$, 95-105 mA/cm$^2$, or about 100 mA/cm$^2$.

In one embodiment, the thin film electrode has a mass activity in range of 30-45 A/g, preferably 32-42 A/g, more preferably 34-38 A/g, or about 35 A/g. The mass activities may be measured at a specific potential range of 1.5-1.65 V, 1.55-1.6 V, or about 1.58 V vs. RHE.

In one embodiment, the thin film electrode has a current density of 100-250 mA/cm$^2$, preferably 125-225 mA/cm$^2$, more preferably 150-200 mA/cm$^2$ when the electrochemical cell is subjected to a bias potential of 1.65-1.75 V, preferably 1.67-1.73 V, or about 1.7 V.

In one embodiment, the thin film electrode has a Tafel slope in a range of 90-105 mV/decade, preferably 92-101 mV/decade, more preferably 95-99 mV/decade, or about 98 mV/decade. Preferably, the thin film electrode has a Tafel slope no greater than 125 mV/decade, preferably no greater than 122 mV/decade, more preferably no greater than 112 mV/decade.

It is worth noting that the thin film electrodes having cobalt oxide nanoflowers (i.e., CoO—NF) provides better electrocatalysis activities than those having cobalt oxide nanoparticles (i.e., CoO—NP) and/or cobalt oxide nanobuds (i.e., CoO—NB). This may be due to the increased surface area and/or increased electroactive surface area of the thin film electrode having cobalt oxide nanoflowers, which can be formed with longer deposition time (i.e., about 45 minutes).

Figure 5A:
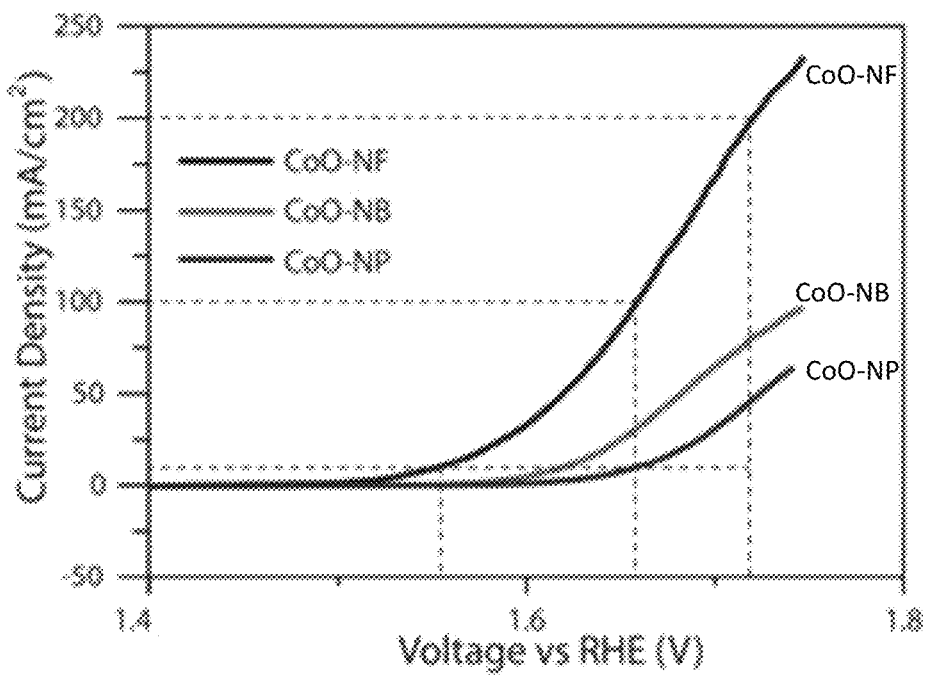
FIG. 5A is an overlay of linear sweep voltammetry (LSV) curves of the CoO—NP, CoO—NB, and CoO—NF films.

In one embodiment, the thin film electrodes having cobalt oxide nanoflowers have a current density that is 60-80% greater than that of thin film electrodes having cobalt oxide nanobuds, preferably 62.5-75% greater, more preferably 65-70% greater than that of thin film electrodes having cobalt oxide nanobuds when the electrochemical cell is subjected to a bias potential of 1.65-1.75 V, preferably 1.67-1.73 V, or about 1.7 V (see FIG. 5A). In a related embodiment, thin film electrodes having cobalt oxide nanoflowers have a current density that is 80-99% greater than that of thin film electrodes having cobalt oxide nanoparticles (e.g., nanospheres), preferably 85-95% greater, more preferably 87.5-90% greater than that of a thin film electrodes having cobalt oxide nanoparticles when the electrochemical cell is subjected to a bias potential of 1.65-1.75 V, preferably 1.67-1.73 V, or about 1.7 V (see FIG. 5A).

A small Tafel slope typically indicates well-balanced kinetics during electrochemical catalysis [Shinagawa, T.; Garcia-Esparza, A. T.; Takanabe, K., Insight on Tafel slopes from a microkinetic analysis of aqueous electrocatalysis for energy conversion. *Scientific Reports* 2015, 5, 13801, incorporated herein by reference in its entirety]. In one embodiment, a thin film electrodes having cobalt oxide nanoflowers has a Tafel slope that is 10-20% less than that of a thin film electrodes having cobalt oxide nanobuds, preferably 12.5-18% less, more preferably 14-15% less than that of a thin film electrodes having cobalt oxide nanobuds (see FIG. 5B). In a related embodiment, a thin film electrodes having cobalt oxide nanoflowers has a Tafel slope that is 18-30% less than that of a thin film electrodes having cobalt oxide nanoparticles (e.g., nanospheres), preferably 20-28% less, more preferably 22-25% less than that of a thin film electrodes having cobalt oxide nanoparticles (see FIG. 5B).

According to a fourth aspect, the present disclosure relates to a method of splitting water into H$_2$ and O$_2$. This method involves subjecting the electrodes of the electrochemical cell of the third aspect with a potential of 0.5-2.0 V, preferably 0.6-1.8 V, more preferably 0.8-1.7 V. Here, "the electrodes" refers to the thin film electrode and the counter electrode.

However, in some embodiments, the electrodes may be subjected to a potential of less than 0.5 V or greater than 2.0 V.

Preferably, the thin film electrode functions as the anode, receiving a positive potential to oxidize $OH^-$ into $O_2$ gas and $H_2O$, while the counter electrode functions as the cathode, receiving a negative potential to reduce water into $H_2$ gas and $OH^-$. This process is summarized by the following reactions:

$$2H_2O_{(l)} + 2e^- \rightarrow H_{2(g)} + 2OH^-_{(aq)} \quad \text{Cathode (reduction):}$$

$$4OH^-_{(aq)} \rightarrow O_{2(g)} + 2H_2O_{(l)} + 4e^- \quad \text{Anode (oxidation):}$$

$$2H_2O_{(l)} \rightarrow 2H_{2(g)} + O_{2(g)} \quad \text{Overall reaction:}$$

In another embodiment, the potentials may be switched, wherein the thin film electrode functions as the cathode and receives a negative potential, and the counter electrode functions as the anode and receives a positive potential. In an alternative embodiment, the electrodes may be subjected to an alternating current (AC) in which the anode and cathode roles are continually switched between the two electrodes.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. Preferably, the thin film electrode may be considered the working electrode with the counter electrode being considered the auxiliary electrode. However, in some embodiments, the thin film electrode may be considered the auxiliary electrode with the counter electrode being considered the working electrode.

In one embodiment, the method further involves the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrochemical cell, or an attachment, may be shaped so that the headspace above the thin film electrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 VON $H_2$, relative to a total volume of the receptacle collecting the evolved $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for splitting water may be modified to lead to different reaction rates, yields, and other outcomes. These parameters include, but are not limited to, electrolyte type and concentration, pH, pressure, solution temperature, current, voltage, stirring rate, electrode surface area, texture and nanostructure of the nanostructured layer, substrate conductivity, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve desired water splitting reactions. In other embodiments, the electrochemical cell may be used for other electrochemical reactions or analyses.

The thin film electrode described herein may be used in the field of batteries, fuel cells, photochemical cells, water splitting cells, electronics, water purification, hydrogen sensors, semiconductors (such as field effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis.

The examples below are intended to further illustrate protocols for preparing, characterizing thin film electrodes having a nanostructured film containing cobalt oxide, and uses thereof, and are not intended to limit the scope of the claims.

Example 1

AACVD Fabrication Protocol

Figure 7:
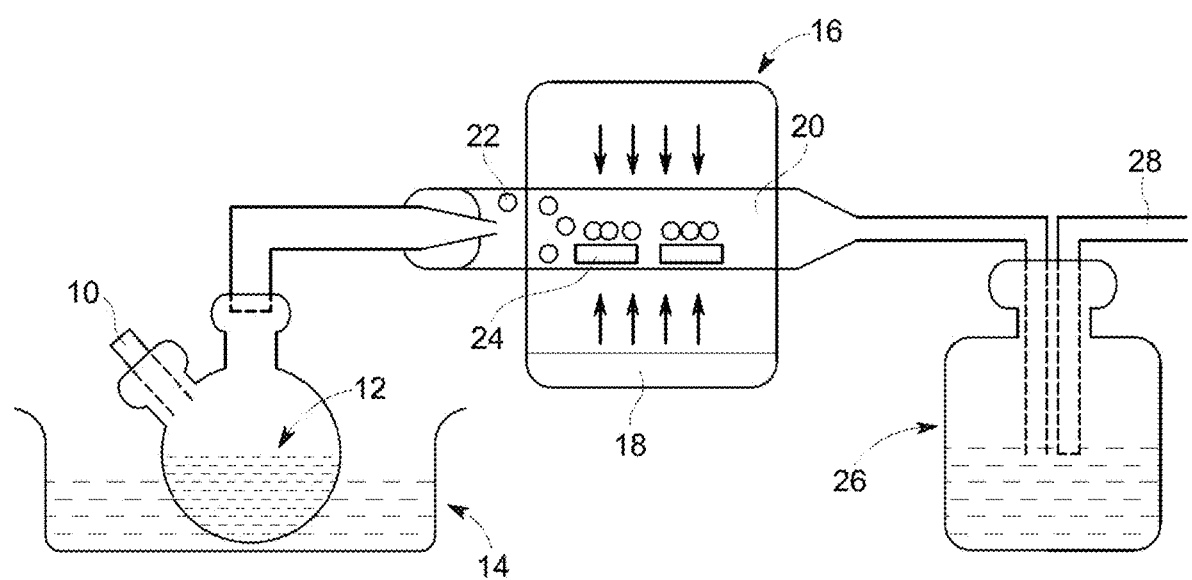
FIG. 7 is a scheme illustrating the AACVD setup used for the synthesis of nanostructured layers comprising cobalt oxide particles.

As shown in FIG. 7, the nanostructured films were obtained directly over the FTO electrodes using AACVD procedure. The chemicals used included cobalt(II) acetylacetonate $(Co(acac))_2)$, and methanol (99.9%), which were obtained from Sigma Aldrich and used as received. The synthesis of Co(II) oxide films was performed by dissolving 500 mg, (0.19 mmol) of $Co(acac)_2$ in methanol (10 mL). The so-obtained transparent and pink violet solution was used for film deposition via AACVD procedure.

In preparation of the deposition process, FTO glass substrates were cut to pieces with an area of $1.0 \times 2.0$ cm². Then, the FTO glass substrates were sequentially washed with soapy water, acetone, and ethanol. These substrates were subsequently loaded inside a reactor tube, which had a deposition temperature of 475° C. The FTO glass substrates were kept there for 10 minutes to reach a thermal equilibrium before carrying out the deposition.

An ultrasonic humidifier was used to produce an aerosol mist of the precursor solution using piezoelectric principle. Nitrogen gas was used as a carrier gas to transport the aerosol to the reaction chamber at a rate of 120 cm³/min. The process was continued until after a specified deposition time, after which, the coated substrates were brought to room temperature by cooling under a continuous flow of $N_2$ gas, before being removed from the chamber. The deposition experiments were carried out for three different time periods (i.e., 15 min, 30 min, and 45 min), and resultant film electrodes were named according to the surface structures obtained.

FIG. 7 is a depiction of a custom built AACVD setup (not to the scale) used for the hierarchical growth of CoO nanostructures in which the Co(II) acetylacetonate precursor solution was converted into an aerosol mist with nitrogen carrier gas by using ultrasonic humidifier, which was then transferred to a tube furnace where the FTO substrates were placed at a specific temperature to complete the deposition process. The waste mist was then vented to a fume hood through a gas trap and exhaust pump.

Example 2

Electrodes Characterization

The nanostructured cobalt(II) oxide films were analyzed by their X-ray diffraction (XRD) patterns obtained via a PANanalytical, X'PertHighScore diffractometer with primary monochromatic high intensity $CuK_\alpha$ ($\lambda$=1.5418 Å) radiation. The surface topography of the films was observed using a Lyra 3 Tescan, field emission gun (FEG)-SEM at an accelerating voltage of 5 kV and a working distance of 10 mm. The atomic ratios of the resulting films were determined using Energy dispersive X-ray (EDX, *INCA* Energy 200, Oxford Inst.) spectrometer. X-ray photoelectron spectroscopy (XPS) data was collected using an ULVAC-PHI Quantera II with a 32-channel Spherical Capacitor Energy Analyzer under vacuum ($1\times10^{-6}$ Pa) using monochromatic Al K$\alpha$ radiation (1486.8 eV) with a natural energy width of 680 meV. The carbonaceous C is line (284.6 eV) was used as a reference to calibrate the binding energies.

Example 3

Electrochemical Measurements

The electrochemical measurements were performed on an AUTOLAB potentiostat employing the thin film fabricated electrodes as the working electrode, while having saturated Ag/AgCl in saturated solution of KCl as the reference electrode and Pt wire shaped into a spiral (thickness=0.25 mm) as the counter electrode. For these electrochemical experiments, all measured potentials were calibrated to reversible hydrogen electrode (RHE) following the Nernst equation as shown below.

$$E_{RHE}=E_{REF}+E_{0\ REF}+0.059(\text{pH})$$

Before being inserted into the electrochemical cell, Pt-counter electrode was cleaned using a 20% solution of $HNO_3$ followed by a wash with MilliQ water. All the glassware and electrochemical cell was cleaned by boiling in a 1:3 mixtures of $H_2SO_4$ and $HNO_3$ and then rinse with boiling water. Finally, all the components were carefully rinsed with acetone and dried in oven at 100° C. for 1 hour as described previously [Yu, F.; Li, F.; Zhang, B.; Li, H.; Sun, L., Efficient Electrocatalytic Water Oxidation by a Copper Oxide Thin Film in Borate Buffer. *ACS Catalysis* 2015, 5 (2), 627-630, incorporated herein by reference in its entirety]. Electrochemical experiments including cyclic voltammetry, EIS, and controlled potential bulk electrolysis techniques were performed in 0.5 M KOH electrolyte solution (pH≈13.6). Water used to make all the solutions for electrochemical studies was distilled and deionized using Milli.Q system from Millipore. Linear sweep voltammetry was used in order to identify overpotentials and current density profiles of the films.

Example 4

Hierarchical Growth of Cobalt(II) Oxide in AACVD

Hierarchical growth of CoO films obtained at three different deposition times (i.e., 15, 30, and 45 minutes) was studied. For the deposition procedure, cobalt(II) acetylacetonate precursor solution and an in-house devised AACVD procedure reported earlier [Ehsan, M. A.; Aziz, M. A.; Rehman, A.; Hakeem, A. S.; Qasem, M. A. A.; Saadi, O. W., Facile Synthesis of Gold-Supported Thin Film of Cobalt Oxide via AACVD for Enhanced Electrocatalytic Activity in Oxygen Evolution Reaction. *ECS Journal of Solid State Science and Technology* 2018, 7 (12), P711-P718; and Ehsan, M. A.; Aziz, M. A.; Rehman, A.; Hakeem, A. S.; Qasem, M. A. A.; Ahmad, S. H. A., Aerosol-Assisted Chemical Vapor Deposition of Silver Thin Film Electrodes for Electrochemical Detection of 2-Nitrophenol. *Journal of The Electrochemical Society* 2018, 165 (7), B302-B309, each incorporated herein by reference in their entirety] were used (see FIG. 7). The Co(II) precursor used herein is commercially available, and has appreciable solubility in methanol and other organic solvents without using any solubility enhancing reagent. Therefore, homogenous, clear, and precipitation free solutions containing the Co(II) precursor were obtained, which was crucial for applying a precursor in AACVD procedure to obtain meaningful results.

The deposition was carried out at a relatively low temperature of 475° C. Well-adhered olive green color films were obtained at all three deposition times. The surface morphological images shown in FIGS. 1A-F indicate a characteristic structural transition.

Figure 1B:
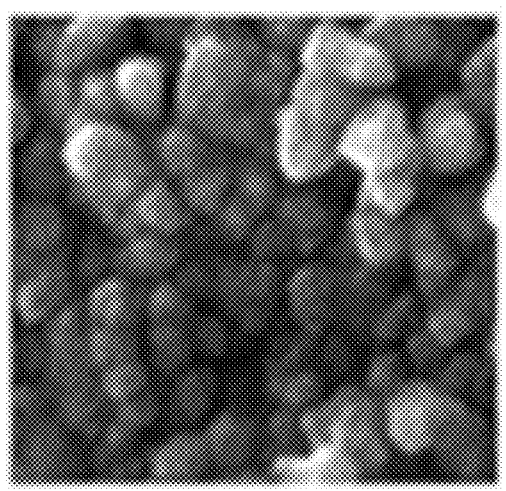
FIG. 1B is a high resolution FESEM image of the CoO—NP film.
Figure 1C:
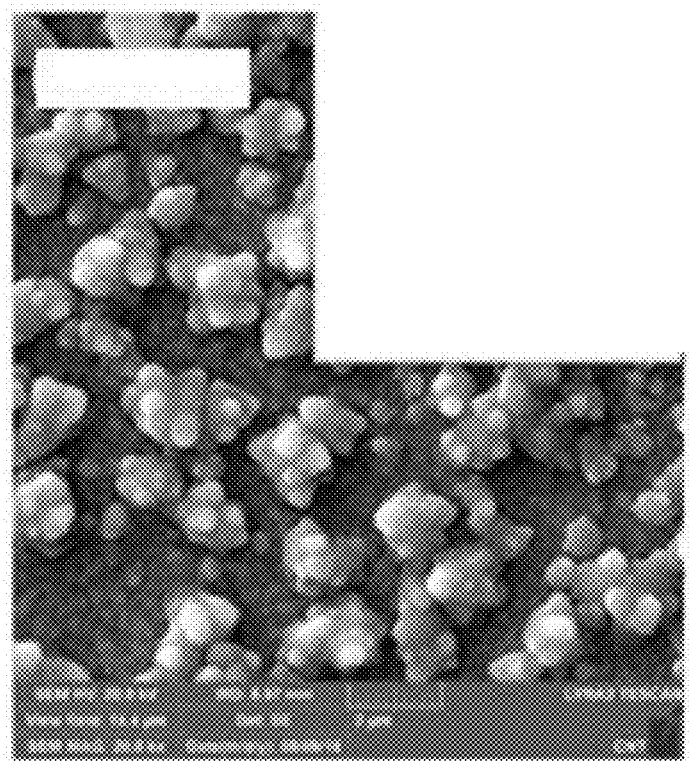
FIG. 1C is a large area, low resolution FESEM image of the CoO—NB film.
Figure 1D:
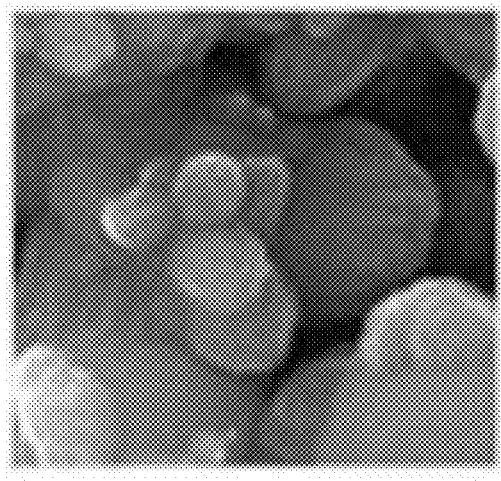
FIG. 1D is a high resolution FESEM image of the CoO—NB film.
Figure 1E:
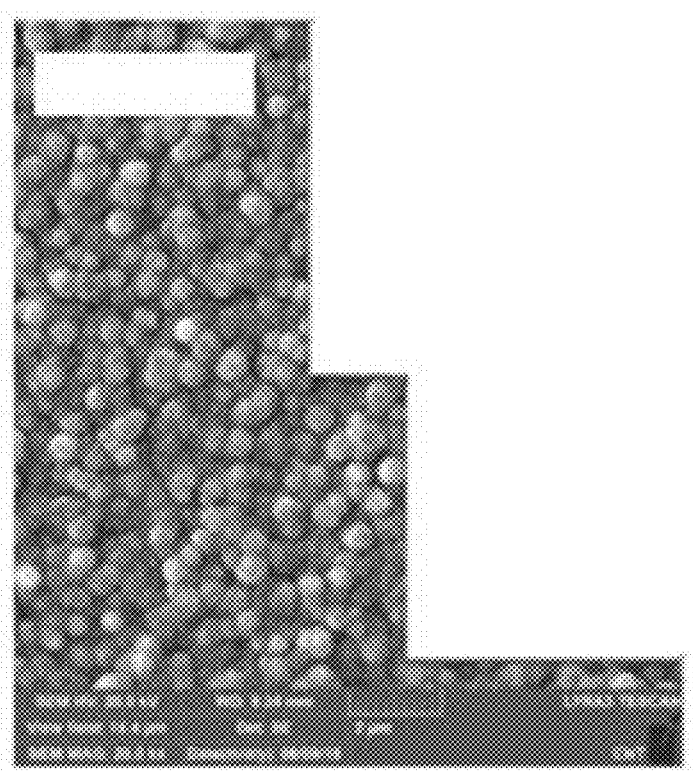
FIG. 1E is a large area, low resolution FESEM image of the CoO—NF film.
Figure 1G:
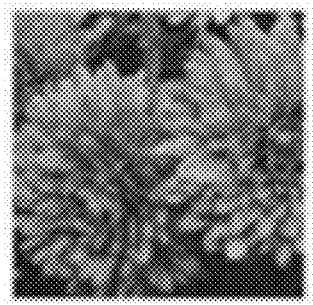
FIG. 1G is an image of a real flower that resembles the flower-like morphology of the CoO—NF film (detailed descriptions of CoO—NP, CoO—NB, and CoO—NF films can be found in Example 4).

FIGS. 1A-B show FESEM images of the nanostructures formed via AACVD in 15 minutes with a denser population of CoO nanoparticles which are shown to be coalescing together (FIG. 1B), which might be the beginning of new nanostructures. FIGS. 1C-D show FESEM images of the nanostructures formed via AACVD in 30 minutes with nanoparticles coalesced to form large aggregates in the form of CoO nanobuds and the petals are shown to be originating from these buds (FIG. 1D). FIGS. 1E-F are FESEM images of the nanostructures formed via AACVD in 45 minutes with fully formed dense population of CoO nanoflowers with a magnified image of the nanoflowers (FIG. 1F). An image of a real flower is included for comparison (FIG. 1G).

The initial stage of this transition was the formation of CoO—NP with their dense population on the surface of FTO within the first 15 minutes of deposition process (FIG. 1A). As shown in the higher resolution image (FIG. 1B), some of these particles are coalescing together to form other structures. This pattern of forming different structures is quite common in AACVD depositions.

By increasing the deposition time to 30 minutes, the coalescing phenomenon led to the formation of CoO—NB in large aggregating structures (FIG. 1C). As shown by the higher resolution image of the same film (FIG. 1D), each of these aggregated structure can give rise to multiple CoO—NF, where petals are seen radiating from the core-bud in multiple directions.

By further increasing the deposition time to 45 minutes, the desired 3D nano-flowery structure in the form of well adhered and well-ordered film was obtained, in which the flowers were evenly distributed over the surface in a dense fashion (FIG. 1E). The size range distribution of the obtained nanoflowers was quite even (i.e., 300-400 nm). The higher resolution image (FIG. 1F) indicates that the flowers are composed of small nanorods with 50-100 nm in length and 25-50 nm in diameter, all radiating from a central core. However, the roots and the tips of the nanopetals (nanorods) have almost the same diameter, giving these nanoflowers a unique appearance which resembles actual flowers shown in the colored inset (FIG. 1G). The nanoflowers assembled from nanorods obtained by this procedure are more robust under ultrasonic treatment, as compared to those fabricated from aggregated blocks [Zhu, Y.; Yang, Q.; Zheng, H.; Yu, W.; Qian, Y., Flower-like cobalt nanocrystals by a complex precursor reaction route. *Materials Chemistry and Physics* 2005, 91 (2), 293-297, incorporated herein by reference in its entirety] through magnetic interactions. This indicated that the hierarchical growth method led to quite stable nanostructures.

Further, EDX analysis of all cobalt oxide films was conducted and results are shown in FIGS. 2A-F, which confirms the presence of Co as a major element in each film.

Example 5

Characterization of CoO Nanostructures: XRD

Figure 3:
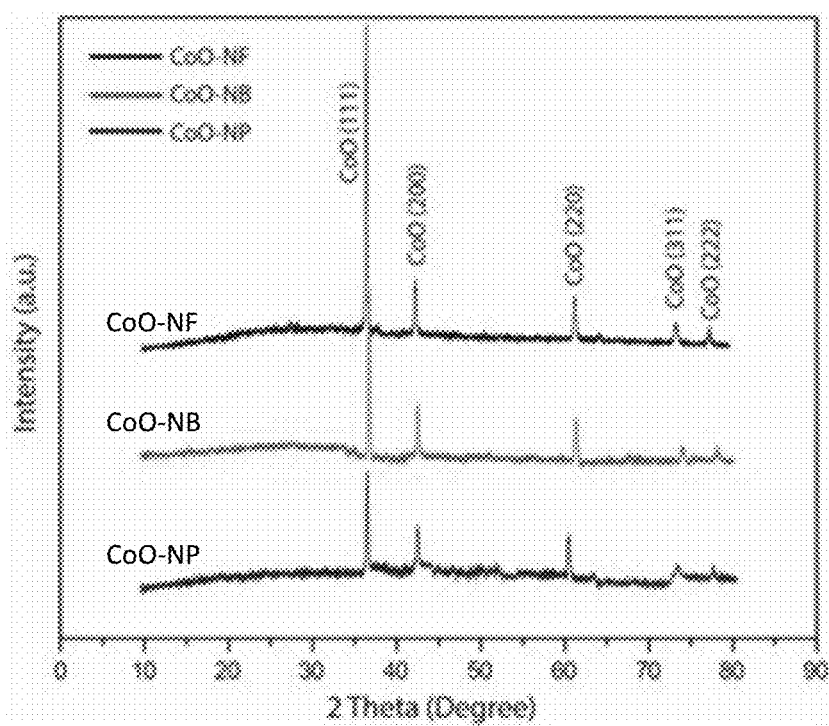
FIG. 3 is an overlay of X-ray diffraction (XRD) patterns of the CoO—NP, CoO—NB, and CoO—NF films.

FIG. 3 demonstrates the XRD patterns of the three films formed via AACVD deposition at different deposition times. The appearance of diffraction peaks in each case matches well with standard cubic CoO materials with no detectable impurities. It was clearly demonstrated that the (111)-facet of the material was being preferentially exposed while transitioning from CoO—NP to CoO—NF. In the meantime, there was a bit of enhancement of other facets, which were not significant. This is an indication of a slight increase in crystallinity of the material while increasing the deposition time.

Example 6

Characterization of CoO Nanostructures: XPS

XPS measurements were performed to further probe the local chemical and electronic environment on the surface of the formed nanostructures.

Figure 4A:
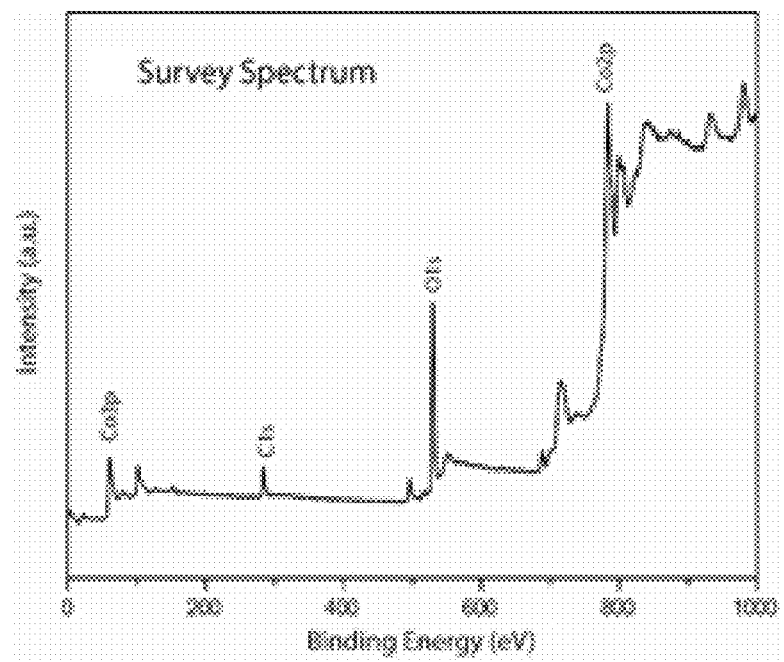
FIG. 4A is an X-ray photoelectron spectroscopy (XPS) survey spectrum showing peaks for Co and O.
Figure 4B:
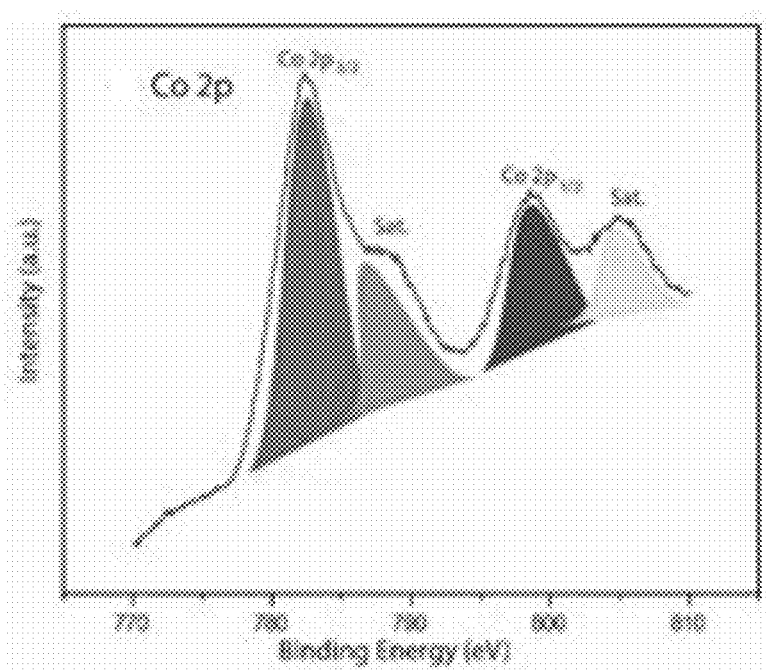
FIG. 4B shows high resolution XPS spectra of the CoO—NF film revealing binding energy peaks for Co 2p.
Figure 4C:
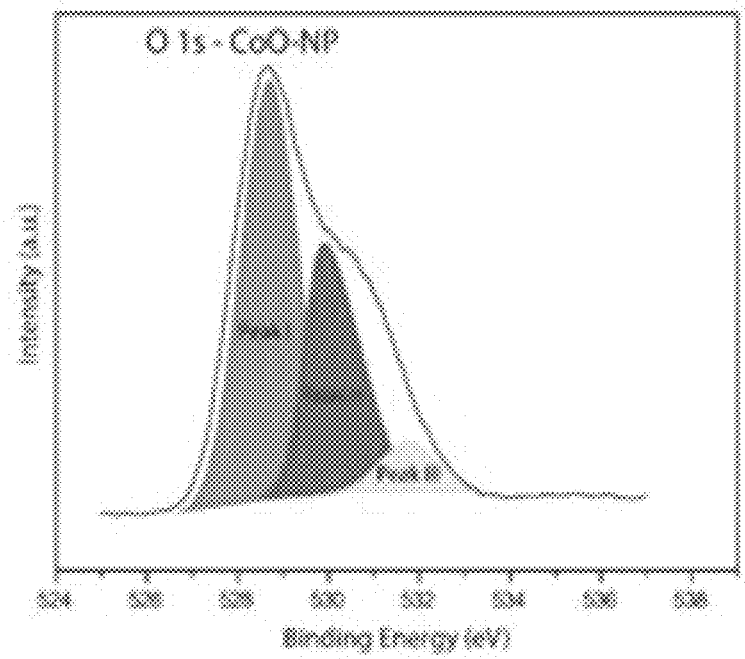
FIG. 4C shows high resolution XPS spectra of the CoO—NP film revealing binding energy peaks for O 1s.
Figure 4D:
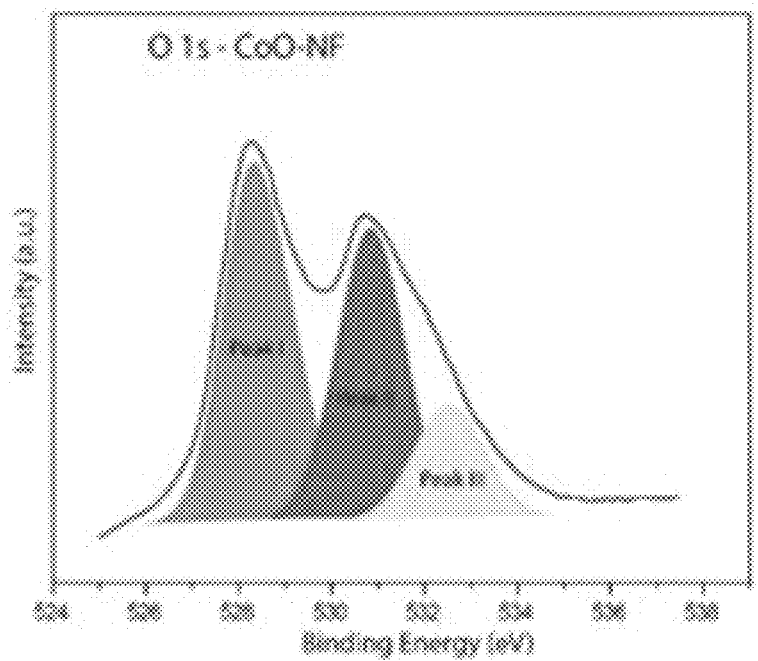
FIG. 4D shows high resolution XPS spectra of the CoO—NF film revealing binding energy peaks for 0 1s.

FIG. 4A is a XPS survey spectrum showing peaks for Co and O. FIG. 4B is high resolution XPS spectrum (indicated with line) and the de-convoluted peaks (indicated by colored peaks) for Co 2p confirming the formation of pure CoO materials via AACVD process. The two satellite peaks show the existence of $Co^{2+}$.

In accordance with EDX analysis, the survey spectrum (FIG. 4A) indicated the presence of both Co and O in the nanostructures. The high-resolution XPS spectrum of Co2p was also obtained (FIG. 4B). This XPS spectrum was further de-convoluted into four peaks, two centered at 780.5 eV and 798.5 eV (Red and Blue) for Co 2p3/2 and Co 2p1/2, respectively, and two centered at 789 eV and 806 eV (Green and Yellow), which are satellite peaks representing the existence of $Co^{2+}$ species and characteristic of CoO materials [Peng, C.; Chen, B.; Qin, Y.; Yang, S.; Li, C.; Zuo, Y.; Liu, S.; Yang, J., Facile Ultrasonic Synthesis of CoO Quantum Dot/Graphene Nanosheet Composites with High Lithium Storage Capacity. *ACS Nano* 2012, 6 (2), 1074-1081, incorporated herein by reference in its entirety].

The collective characterization of the XPS spectra indicates the successful preparation of CoO. As shown in FIGS. 4C and 4D, the O 1 s spectra for CoO—NP and CoO—NF, respectively, were analyzed via de-convolution of peaks, with different structures showing different strengths of de-convoluted peaks. Both materials show three de-convoluted peaks, including a low binding energy peak I, a middle binding energy peak II, and a high binding energy peak III. The peak II area is attributed to the number of lower oxygen coordination sites.

Example 7

Electrochemical Water Oxidation Studies

FTO substrates with comparatively low conductivity were intentionally chosen to demonstrate the real effect of the materials on the catalytic process, in contrast to many studies where the chosen substrate by itself has high conductivity and thus facilitates the oxidation process. For instance, materials immobilized on gold foam (i.e., 10-25 ohm) [Liu, J.; Ji, Y.; Nai, J.; Niu, X.; Luo, Y.; Guo, L.; Yang, S., Ultrathin amorphous cobalt-vanadium hydr(oxy)oxide catalysts for the oxygen evolution reaction. *Energy & Environmental Science* 2018, 11 (7), 1736-1741, incorporated herein by reference in its entirety], nickel foam (i.e., 1.0-1.4 ohm) [Liardet, L.; Hu, X., Amorphous Cobalt Vanadium Oxide as a Highly Active Electrocatalyst for Oxygen Evolution. *ACS Catalysis* 2018, 8 (1), 644-650, incorporated herein by reference in its entirety], glassy carbon (i.e., 0.6-0.8 ohm) [Liardet, L.; Hu, X., Amorphous Cobalt Vanadium Oxide as a Highly Active Electrocatalyst for Oxygen Evolution. *ACS Catalysis* 2018, 8 (1), 644-650, incorporated herein by reference in its entirety], and carbon foam (4.0-8.0 ohm) [Thorat, G. M.; Jadhav, H. S.; Roy, A.; Chung, W.-J.; Seo, J. G., Dual Role of Deep Eutectic Solvent as a Solvent and Template for the Synthesis of Octahedral Cobalt Vanadate for an Oxygen Evolution Reaction. *ACS Sustainable Chemistry & Engineering* 2018, 6 (12), 16255-16266, incorporated herein by reference in its entirety] have shown at least ten times higher conductivity as compared to those immobilized on FTO substrate. FTO substrates have the advantage of being scalable for large-scale application due to their low cost.

FIGS. 5A-D depict various electrochemical studies on the water oxidation reaction conducted using the directly deposited crystalline films of CoO nanostructures on the FTO substrates without any further modification.

Figure 5B:
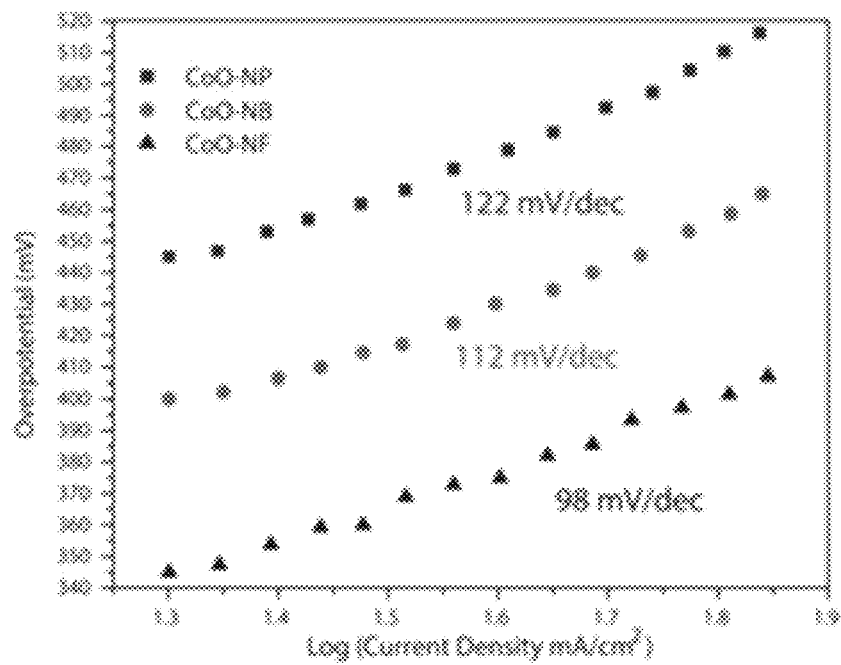
FIG. 5B is a graph illustrating the Tafel slopes of the CoO—NP, CoO—NB, and CoO—NF films, respectively.
Figure 5C:
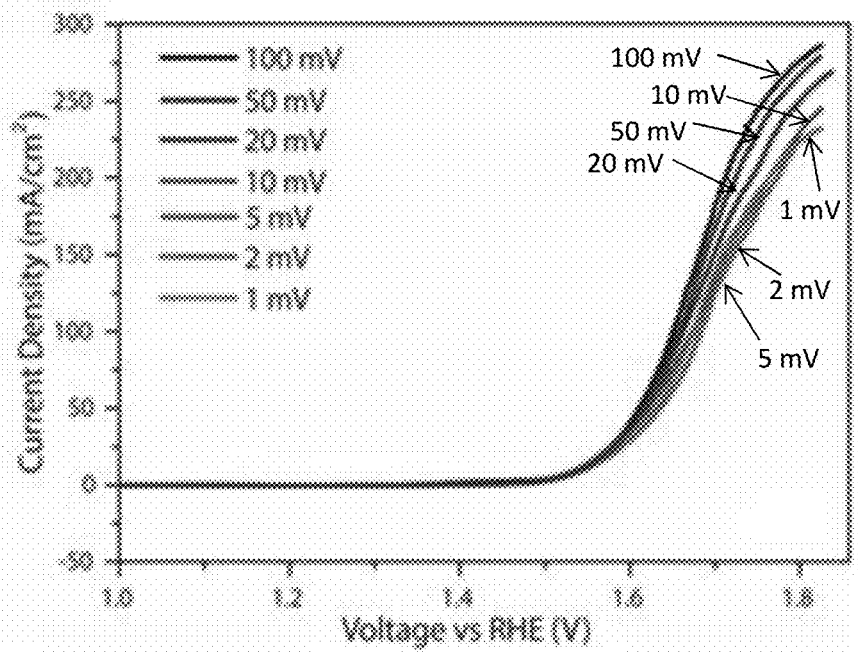
FIG. 5C is an overlay of LSV curves of the CoO—NF film at different scan rates.
Figure 5D:
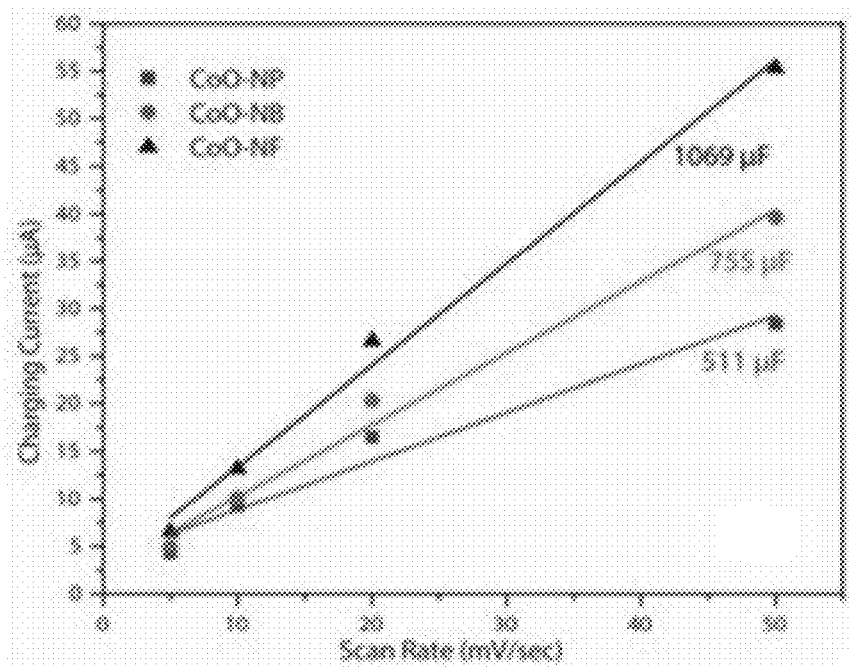
FIG. 5D shows the charging current vs. the scan rate recorded in the non-faradic region, and the calculated slope values for the CoO—NP, CoO—NB, and CoO—NF films.

FIG. 5A shows LSV curves for different nanostructured CoO films. The experiments were performed in 0.5 M KOH electrolyte at a scan rate of 50 mV/sec, showing the onset potential, and overpotential for current densities of 10 mA/cm², 100 mA/cm², and 200 mA/cm². FIG. 5B shows Tafel slopes of the nanostructured films as obtained from LSV data, which indicate that the slope values are changing from the highest to the lowest while the nanostructure is changing from 1D to 3D with enhancement of the defects as described in more detail below. FIG. 5C shows variations of LSV curves against different scan rates under the same experimental conditions showing that the kinetics is more enhanced at higher scan rates. FIG. 5D shows charging current values of different CoO nanostructured films recorded in the non-faradic region at scan rates of 5, 10, 20, and 50 mV/sec from which the electrochemically active surface area is determined with the units of µF per unit area and shown as the slope of the best linear fit lines for all three films.

Three-electrode configuration of an electrochemical cell was used for the electrochemical experiments performed in a 0.1 M KOH electrolyte. FIG. 5A shows the linear sweeps voltammetry (LSV) curves for all three CoO nanostructures at a scan rate of 50 mV/sec. When the data for the overpotential is compared with that for a current density of 10 mA/cm², which is often considered as a reference for providing 10% efficiency in water splitting reactions, it is clear that CoO—NF films have outperformed the other two films in catalytic activity. The CoO—NF film showed a remarkable performance in terms of onset overpotential vs RHE (i.e., 280 mV) and an overpotential at 10 mA/cm² (i.e., 325 mV). CoO—NB and CoO—NP films achieved relatively high onset potentials, (i.e., 390 mV and 430 mV of overpotential, respectively, and current density of 10 mA/cm²). This indicates that the development of 3D hierarchical structure is beneficial for the electrocatalytic activity. CoO—NP and CoO—NB films are transition points to obtain the final 3D structure with high population of oxygen defects and a much lower overpotential for water oxidation.

Importantly, the nanostructured films disclosed herein can be prepared quickly via a much less complicated synthetic procedure. Despite being directly deposited onto a much less conductive FTO substrate without any further processing, the nanostructured films exhibit comparable or more superior catalytic performance than many other CoO nanostructured materials reported previously. The comparison data is provided in Table 1, with a brief description of the synthetic method indicating the time required to fabricate the CoO films.

Tian, P.; Wang, X., Wafer-scale synthesis of ultrathin CoO nanosheets with enhanced electrochemical catalytic properties. *Journal of Materials Chemistry A* 2017, 5 (19), 9060-9066; [g] Ling, T.; Yan, D.-Y.; Jiao, Y.; Wang, H.; Zheng, Y.; Zheng, X.; Mao, J.; Du, X.-W.; Hu, Z.; Jaroniec, M.; Qiao, S.-Z., Engineering surface atomic structure of single-crystal cobalt (II) oxide nanorods for superior electrocatalysis. *Nature Communications* 2016, 7, 12876, each incorporated herein by reference in their entirety].

A comparison of overpotential data at current densities of 100 mA/cm² and 200 mA/cm² indicates that the LSV curve for CoO—NF rises sharply in achieving these high current density values at overpotentials of 428 mV and 488 mV, respectively. A further increase in the overpotential leads the current density value close to 250 mA/cm² (i.e., still under 1.8 V vs RHE). This actually satisfies one of the requirements of commercial materials generating current densities of 200-400 mA/cm² in the potential range of 1.8-2.4 V vs RHE [Zhou, H.; Yu, F.; Zhu, Q.; Sun, J.; Qin, F.; Yu, L.; Bao, J.; Yu, Y.; Chen, S.; Ren, Z., Water splitting by electrolysis at high current densities under 1.6 volts. *Energy & Environmental Science* 2018, 11 (10), 2858-2864, incorporated herein by reference in its entirety]. Many robust electrocatalytic materials designed for alkaline electrolyzers have failed

TABLE 1

Comparison of the electrocatalytic water oxidation performance in alkaline conditions using Co(II)oxide having different structural morphologies

| Catalyst | Synthetic Approach | Electrode | Overpotential (10 mAcm⁻²) | Overpotential (100 mAcm⁻²) | Ref |
|---|---|---|---|---|---|
| CoO NP | Phase Transfer Reactions (13 h) and Calcination (3 h) | GC | 312 mV | 390 mV | [a] |
| CoO Hexagrams | Phase Transfer and Calcination for 3 h | GC | 269 mV | 410 mV | [b] |
| CoO NP @Ni Foam | Colloidal Synthesis | Ni Foam | 497 mV | 646 mV | [c] |
| CoO NS | IL assisted ionothermal synthesis (5 h) | Carbon cloth | 320 mV | 395 mV | [d] |
| PGE-CoO | Hard template self-assembly, calcination, and heat treatment for 2 h | GC | 348 mV | 460 mV | [e] |
| CoO NS @p-Si | Ionic layer epitaxy, thermal annealing 1 h | p-Si substrate | 560 mV | >770 mV | [f] |
| Single Crystal CoO NR | Hydrothermal Synthesis (3 h) and Cation Exchange Reaction (30 min) | Carbon fiber paper | 330 mV | >470 mV | [g] |
| Heirarchical CoO—NF | Direct deposition via AACVD (45 min) | FTO substrate | 325 mV | 425 mV | This work |

[References: [a] Guo, D.; Chen, F.; Zhang, W.; Cao, R., Phase-transfer synthesis of α-Co(OH)2 and its conversion to CoO for efficient electrocatalytic water oxidation. *Science Bulletin* 2017, 62 (9), 626-632; [b] Liang, Z.; Huang, Z.; Yuan, H.; Yang, Z.; Zhang, C.; Xu, Y.; Zhang, W.; Zheng, H.; Cao, R., Quasi-single-crystalline CoO hexagrams with abundant defects for highly efficient electrocatalytic water oxidation. *Chemical Science* 2018, 9 (34), 6961-6968; [c] Chou, N. H.; Ross, P. N.; Bell, A. T.; Tilley, T. D., Comparison of Cobalt-based Nanoparticles as Electrocatalysts for Water Oxidation. *Chem Sus Chem* 2011, 4 (11), 1566-1569; [d] Jiang, A.; Nidamanuri, N.; Zhang, C.; Li, Z., Ionic-Liquid-Assisted One-Step Synthesis of CoO Nanosheets as Electrocatalysts for Oxygen Evolution Reaction. *ACS Omega* 2018, 3 (8), 10092-10098; [e] Zhao, Y.; Sun, B.; Huang, X.; Liu, H.; Su, D.; Sun, K.; Wang, G., Porous graphene wrapped CoO nanoparticles for highly efficient oxygen evolution. *Journal of Materials Chemistry A* 2015, 3 (10), 5402-5408; [f] Wang, F.; Yu, Y.; Yin, X.; Tian, P.; Wang, X., Wafer-scale synthesis of ultrathin CoO nanosheets with enhanced electrochemical catalytic properties. *Journal of Materials Chemistry A* 2017, 5 (19), 9060-9066, each incorporated herein by reference in their entirety] which rarely indicate the potentials can attain a current density of more than 200 mA/cm². The superior performance of CoO—NF material disclosed herein can be justified by the 3D architecture of the film structure as indicated by the SEM topography as well as the high estimated population of O-vacancies as depicted by XRD and XPS analyses. The 3D structure with a spongy appearance coupled with a greater number of accessible catalytic sites allowed the reaction to proceed much more efficiently. Consequently, the overpotential is reduced and the current density jumps to higher values at lower potentials.

Tafel experiment results, which study the sustainability and the consistent rate of water oxidation reaction, also depict that the present nanostructured materials have a high current density at low overpotential. Tafel plots were drawn for all three nanostructured films within similar regions of the current density against overvoltage at a scan rate of 50 mV/sec, and were fitted into the Tafel equation as shown in FIG. 5B. This analysis provides an indication of the narrow potential range while producing a high current density. A small Tafel slope is an indication of well-balanced kinetics during catalysis [Shinagawa, T.; Garcia-Esparza, A. T.; Takanabe, K., Insight on Tafel slopes from a microkinetic analysis of aqueous electrocatalysis for energy conversion. *Scientific Reports* 2015, 5, 13801, incorporated herein by reference in its entirety]. Here, the slope values for the three films are only slightly different from each other, demonstrating a sufficiently high kinetics for all of them. However, the working range of the CoO—NF film is much wider while maintaining the lowest Tafel slope of 98 mV/dec. This indicates that catalytic performance is dependent on the number of active sites on the surface structure of the material. An open structure and 3D morphological features of CoO—NF film catalyst facilitate a fast mass transport and boosts electron transfer without any scattering losses, as a greater number of catalytic sites are readily available.

When the CoO—NF film was subjected to a scan rate study, it was found that increasing the scan rate from 1 mV/sec to 100 mV/sec had no obvious impact on the onset potential and the overpotential for 10 mA/cm$^2$ of current density. However, the scan rate significantly affected the catalytic process for higher current densities. A current density greater than 200 mA/cm$^2$ is achievable below 1.8 V vs RHE at all different scan rates. However, for higher scan rates such as 100 mV/sec, the overpotential to achieve this commercial standard of current density is faster at a lower energy cost in terms of applied voltage. Moreover, the current density at this scan rate reaches the value of 280 mA/cm$^2$ for less than 1.8 V vs RHE. The water splitting performance of these nanostructured materials is quite remarkable, when taking into consideration that they can be prepared by a facile and rapid fabrication strategy taking only minutes, and that the FTO substrates used in this study have low conducting behavior.

Quantitative parameters for the catalytic characterization of the films such as mass activities and electrochemically active surface areas (ECSA) were also determined. The mass activities of the CoO—NP, CoO—NB, and CoO—NF were determined to be 21.4 A/g, 28.6 A/g, and 35.2 A/g, respectively. As represented in FIG. 5D, the ECSA values for these three films were determined to be 511 µF, 755 µF, and 1069 µF, respectively, which are significantly different from each other.

The mass activities data corroborate the Tafel plots. Smaller Tafel slopes are linked to higher mass activity and vice versa. The higher mass activity of the 3D nanoflowers as compared to other nanostructures further demonstrate the high mass performance of this hierarchical material having higher number of catalytic oxygen defect sites available and responsible for the OER. Thus, the results are in line with the data obtained from the XRD, confirming the nanoflower structure has a larger population of these defect sites. On the other hand, the calculated values of ECSA provide an estimation of the available catalytic sites, which were numerically assessed from the double-layer capacitances measurements. A significantly higher ECSA of CoO—NF film as compared to the other two films further indicates that the CoO—NF film has a greater number of active sites available, thereby making the catalytic reaction kinetically more favorable.

Figure 6A:
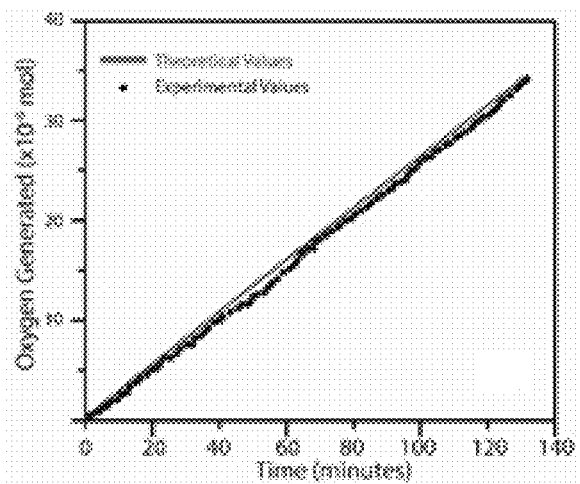
FIG. 6A is an overlay of theoretical and experimental values of $O_2$ generated by an electrochemical cell having a thin film electrode containing the CoO—NF film over a period of 2 hours at an applied potential of 1.6 V vs. RHE bias.

In a separate experiment, the faradic efficiency of the OER reaction was determined using a rotating ring disk electrode (RRDE). N$_2$ saturated solution was used for the measurement where oxygen gas was generated at the GC disk electrode. The O$_2$ generated was then detected on the Pt-based ring electrode. The increase of catalytic current at the anode was then synchronized to an increase of cathodic current on the ring electrode, thereby confirming that water was being oxidized to O$_2$ and consequently giving rise to catalytic current. As shown in FIG. 6A, the µmole quantities of oxygen detected are plotted against their theoretical values from which the faradic efficiency of the reaction is calculated to be ~96.5%.

Figure 6B:
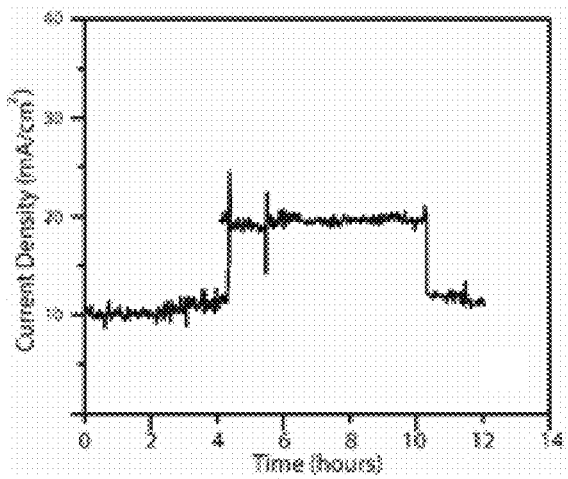
FIG. 6B shows stability test of the thin film electrode containing the CoO—NF film at a constant current density of 10 $mA/cm^2$ for 4 hours, a constant current density of 20 $mA/cm^2$ for 6 hours, and a constant current density of 10 $mA/cm^2$ for 2 hours.
Figure 6C:
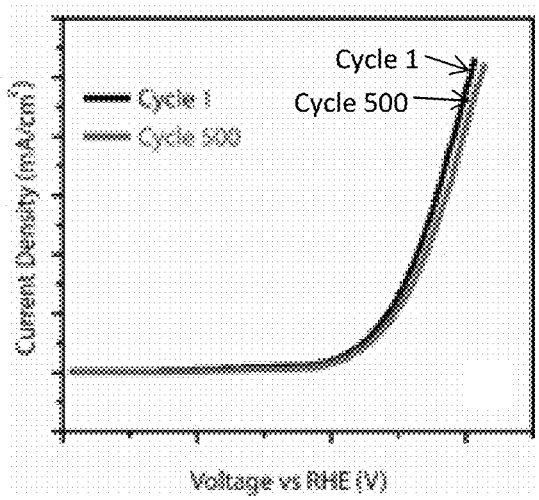
FIG. 6C shows the first and the $500^{th}$ scan of LSV measurement on the thin film electrode containing the CoO—NF film.

A series of experiments were also conducted to show the extended stability of the developed materials in addition to the enhanced catalytic activity. For this purpose, a 12 hour constant anodic polarization was applied alternatively at two different potential values, as shown in FIG. 6B. This process involved initially applying 4-hour of anodic potential relating to a current density of 10 mA/cm$^2$, 6-hour of anodic potential relating to a current density of 20 mA/cm$^2$, then finally the initial current density for additional 2 hours. The prepared catalytic material exhibited very stable responses to these changes, with only nominal fluctuations were observed, which were caused by the accumulation of high density of oxygen molecules covering the active sites at the electrode surface. A rich continuous stream of oxygen in the form of bubbles was seen during all electrocatalytic experiments, which indicated a high rate of oxygen production using these nanostructured metal oxide based electrodes. Moreover, the CoO—NF film electrode exhibited minimal loss of catalytic activity after 500 CV cycles (FIG. 6C). Such reliable catalytic performance of the fabricated films can be attributed to their excellent stability over the FTO electrodes with enhanced activity under alkaline conditions.

Figure 8A:
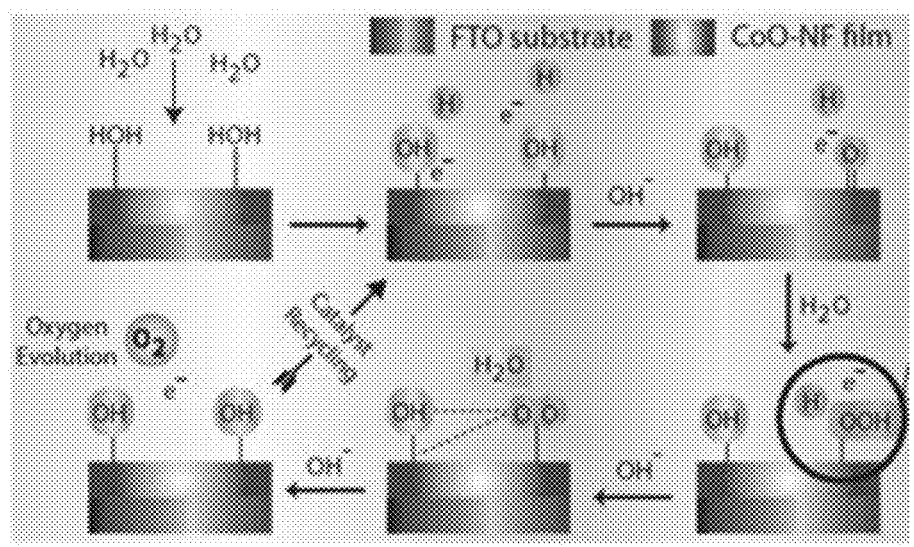
FIG. 8A depicts a proposed mechanism of catalytic water splitting occurring on the thin film electrode containing the CoO—NF film.
Figure 8B:
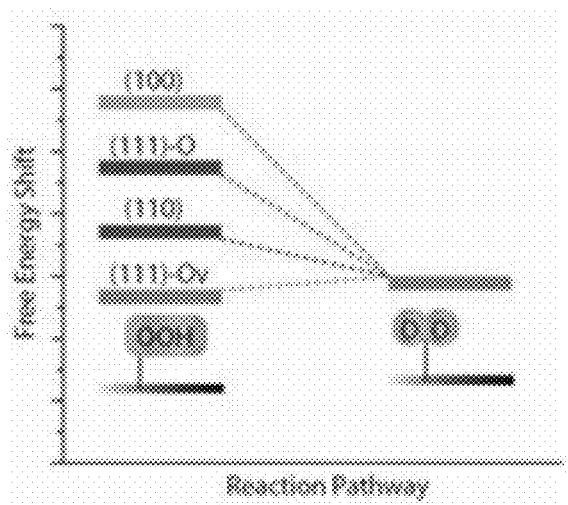
FIG. 8B shows the free energy states of different facets involved in the catalytic water splitting of FIG. 8A.

Furthermore, the above presented data indicate that the active oxygen vacancy sites are responsible for enhanced catalytic activities of CoO materials [Liang, Z.; Huang, Z.; Yuan, H.; Yang, Z.; Zhang, C.; Xu, Y.; Zhang, W.; Zheng, H.; Cao, R., Quasi-single-crystalline CoO hexagrams with abundant defects for highly efficient electrocatalytic water oxidation. *Chemical Science* 2018, 9 (34), 6961-6968; and Ling, T.; Yan, D.-Y.; Jiao, Y.; Wang, H.; Zheng, Y.; Zheng, X.; Mao, J.; Du, X.-W.; Hu, Z.; Jaroniec, M.; Qiao, S.-Z., Engineering surface atomic structure of single-crystal cobalt (II) oxide nanorods for superior electrocatalysis. *Nature Communications* 2016, 7, 12876, each incorporated herein by reference in their entirety]. As shown in FIGS. 8A-B, a plausible mechanism of the catalytic process has been proposed herein [Ehsan, M. A.; Aziz, M. A.; Rehman, A.; Hakeem, A. S.; Qasem, M. A. A.; Saadi, 0. W., Facile Synthesis of Gold-Supported Thin Film of Cobalt Oxide via AACVD for Enhanced Electrocatalytic Activity in Oxygen Evolution Reaction. *ECS Journal of Solid State Science and Technology* 2018, 7 (12), P711-P718; Liu, J.; Ji, Y.; Nai, J.; Niu, X.; Luo, Y.; Guo, L.; Yang, S., Ultrathin amorphous cobalt-vanadium hydr(oxy)oxide catalysts for the oxygen evolution reaction. *Energy & Environmental Science* 2018, 11 (7), 1736-1741; and Xing, Z.; Wu, H.; Wu, L.; Wang, X.; Zhong, H.; Li, F.; Shi, J.; Song, D.; Xiao, W.; Jiang, C.; Ren, F., A multifunctional vanadium-doped cobalt oxide layer on silicon photoanodes for efficient and stable photoelectrochemical water oxidation. *Journal of Materials Chemistry A* 2018, 6 (42), 21167-21177, each incorporated herein by reference in their entirety]. The reaction may initiate with water adsorption, with hydrogen and electrons being discharging to provide surface adsorbed hydroxy groups. Under the forward potential bias, the hydroxy groups may react with free hydroxy ions, thereby leaving the oxygen atoms adsorbed onto the surface. The reaction continues further with the generation of OOH groups, which are considered to be the rate limiting step. However, DFT studies indicate that this process can be facilitated by oxygen vacancies, with (111)-Ov surface outperforming the other facets (see FIGS. 8A-B). Here, the (111)-Ov surface exhibits a mediated adsorption-desorption behavior, thereby benefiting the OER. It is also shown that new electronic states can be developed by Ov created in CoO materials via the hybridization of O-2p, Co-3d, and Co-3s in the bandgap. Such hybridizations can lead to stronger adsorption of intermediates on the vacancy sites with higher electronic conductivity of the synthesized materials. And if the population of these vacancies can be increased, water oxidation catalysts of commercial values may be achieved. After this rate limiting step facilitated by (111)-Ov facets, water molecule is removed from the surface, leaving adsorbed oxygen molecule behind. Finally, the oxygen is removed, completing the oxygen evolution reaction.

Example 8

The present disclosure provides a simple strategy to fabricate and transform hierarchical 1D to 3D structures of CoO with preferential exposure of (111)-facets and desirable distribution of highly active oxygen defect sites. The resulting nanomaterials can be used for water oxidation catalysis. The CoO—NF film catalyzes water oxidation most efficiently due to its high content of active sites as well as its 3D architecture with a larger surface area and stronger adsorption. 3D architecture of Co(II) oxide (CoO) having oxygen defects are highly efficient in electrocatalysis of water.

Specifically, a facile fabrication of 3D structured CoO nanoflowers (CoO—NF) using aerosol assisted chemical vapor deposition (AACVD) was reported herein. Different surface structures of CoO in the form of chemically deposited films were fabricated via the AACVD technique, directly over the transparent fluorine-doped tin oxide (FTO) electrodes just by varying the deposition times. The procedure takes only about 45 minutes of deposition to grow CoO-NFs directly on the FTO substrates in a truly hierarchical fashion, which transforms through stages of nanoparticles (CoO—NP) and nanobuds (CoO—NB). Thus, the influence of different deposition time on the morphology, structure, and catalytic properties of the resulting films were studied. The as-prepared films were characterized by scanning electron microscopy (SEM), energy dispersive X-ray (EDX), X-ray diffraction (XRD), and X-ray photoelectron spectroscopy (XPS).

By varying the deposition time, surface morphology of the CoO changes from nanoparticles that are formed in 15 minutes to nanobuds within 30 minutes deposition, and finally to homogenously distributed and densely populated nanoflowers in 45 minutes. Evolutions of these structures were also accompanied by an enhanced exposure of (111)-facets and an increasing number of oxygen defects which resulted in an enhancement of electrocatalytic activity towards water oxidation.

The CoO nanoflowers (CoO—NF) with highest number of these active oxygen vacancies showed the best performance with an overpotential of 325 mV vs RHE at a current density of 10 mA/cm$^2$ while having a Taefl slope of 98 mV/dec, a mass activity of 35.2 A/g, and the electrochemically active surface area (ECSA) of 1069 µF. Importantly, the current density for CoO—NF jumped sharply to values above 200 mA/cm$^2$ with a potential of less than 1.8 V vs RHE, which meets the commercialization standards as well as provides high stabilities of oxygen generation, current densities, and repeated cycling. Such electrochemical performance is remarkable for a material fabricated via a rapid and facile synthetic route via directly deposition on a low cost and relatively less conductive FTO substrate. This can be attributed to the synergetic effect of a larger specific surface area of 3D structure and the high distribution of oxygen defects of CoO nanoflowers.

The electrocatalytic performance as well as the stability of the proposed material was then evaluated using electrochemical protocols. It has been demonstrated that the water oxidation performance of the CoO-NFs is better than or at least comparable to many reported CoO materials.

The CoO—NF architecture catalyzes O$_2$ generation reaction at 325 mV of overpotential to achieve 10 mA/cm$^2$ of current density which rises to above 200 mA/cm$^2$ at ~1.7 V vs RHE. Accordingly, the CoO—NF film meets the commercialization standards (i.e., 200-400 mA/cm$^2$ below 1.8 V vs RHE). Further, the oxygen generation process catalyzed CoO—NF is very stable, as demonstrated by a consistent current density values in a 12 hour study, an overlapping LSV profile after 500 cycles. Therefore, it can be concluded that the presently disclosed nanostructured materials prepared by the facile AACVD strategy are applicable to durable transition metal oxide based electrochemical devices for greener energy routes. In addition, the AACVD method can be a new avenue for fabricating novel nanomaterials with hierarchical morphologies.

The invention claimed is:
1. A thin film electrode, comprising:
a conducting substrate; and
a nanostructured layer comprising cobalt oxide nanoflowers deposited onto a surface of the conducting substrate, wherein the cobalt oxide consists essentially of CoO;
wherein the cobalt nanoflowers have a central core and a plurality of nanopetals extending from the central core, and wherein the nanopetals have an average diameter in a range of 10-100 nm and an average length in a range of 20-200 nm.
2. The thin film electrode of claim 1, wherein the cobalt oxide nanoflowers have an average particle size in a range of 200-800 nm.
3. The thin film electrode of claim 1, wherein the cobalt oxide nanoflowers are substantially free of $Co_2O_3$ and $Co_3O_4$.
4. The thin film electrode of claim 3, wherein the cobalt oxide nanoflowers exhibit exposed CoO {111} facets.
5. The thin film electrode of claim 1, wherein the conducting substrate is selected from the group consisting of fluorine-doped tin oxide, indium tin oxide, aluminum-doped zinc oxide, gallium-doped zinc oxide, indium zinc oxide, indium zinc tin oxide, indium aluminum zinc oxide, indium gallium zinc oxide, indium gallium tin oxide, and antimony tin oxide.
6. The thin film electrode of claim 1, wherein the conducting substrate is fluorine-doped tin oxide.
7. A method of producing the thin film electrode of claim 1, the method comprising:

contacting an aerosol with the conducting substrate to deposit the nanostructured layer onto the conducting substrate thereby forming the thin film electrode, wherein:

the aerosol comprises a carrier gas and a cobalt complex dissolved in a solvent; and the conducting substrate has a temperature in a range of 400-550° C. during the contacting.

8. The method of claim 7, wherein the cobalt complex is Co(II) acetylacetone, and wherein the solvent is methanol.

9. The method of claim 7, wherein a weight ratio of the cobalt complex to the solvent in the aerosol is in a range of 1:200 to 1:2.

10. The method of claim 7, wherein the aerosol is contacted with the conducting substrate for a time period of 0.75-3 hours.

11. The method of claim 7, wherein the carrier gas has a flow rate in a range of 25-250 $cm^3$/min.

12. An electrochemical cell, comprising:

the thin film electrode of claim 1;

a counter electrode; and an electrolyte solution comprising water and a base in contact with both the thin film electrode and the counter electrode.

13. The electrochemical cell of claim 12, wherein the electrolyte solution has a pH of 9-14.

14. The electrochemical cell of claim 12, wherein the thin film electrode has an overpotential in a range of 310-340 mV at a current density of 9-11 mA/$cm^2$.

15. The electrochemical cell of claim 12, wherein the thin film electrode has a current density of 100-250 mA/$cm^2$ when the electrochemical cell is subjected to a bias potential of 1.65-1.75 V.

16. The electrochemical cell of claim 12, wherein the thin film electrode has a mass activity of 30-40 A/g.

17. The electrochemical cell of claim 12, wherein the thin film electrode has a Tafel slope in a range of 90-105 mV/decade.

18. A method of splitting water into $H_2$ and $O_2$, the method comprising:

subjecting the electrochemical cell of claim 12 to a potential of 0.5 to 2.0 V.

19. The method of claim 18, further comprising separately collecting $H_2$-enriched gas and $O_2$-enriched gas.

* * * * *